(12) United States Patent
Sugaya et al.

(10) Patent No.: US 12,237,924 B2
(45) Date of Patent: Feb. 25, 2025

(54) COMMUNICATION DEVICE AND COMMUNICATION METHOD

(71) Applicant: SONY GROUP CORPORATION, Tokyo (JP)

(72) Inventors: Shigeru Sugaya, Tokyo (JP); Kosuke Aio, Tokyo (JP); Yusuke Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 393 days.

(21) Appl. No.: 17/607,969

(22) PCT Filed: Apr. 27, 2020

(86) PCT No.: PCT/JP2020/017981
§ 371 (c)(1),
(2) Date: Nov. 1, 2021

(87) PCT Pub. No.: WO2020/230615
PCT Pub. Date: Nov. 19, 2020

(65) Prior Publication Data
US 2022/0294567 A1  Sep. 15, 2022

(30) Foreign Application Priority Data

May 10, 2019 (JP) .................... 2019-090050

(51) Int. Cl.
*H04L 1/1607* (2023.01)
*H04B 7/04* (2017.01)
*H04W 72/27* (2023.01)

(52) U.S. Cl.
CPC ............ *H04L 1/1671* (2013.01); *H04B 7/04* (2013.01); *H04W 72/27* (2023.01)

(58) Field of Classification Search
CPC ... H04L 1/1671; H04L 1/1864; H04L 1/1614; H04B 7/04; H04B 7/024; H04W 72/27
See application file for complete search history.

(56) References Cited

U.S. PATENT DOCUMENTS

2009/0232053 A1  9/2009  Taki et al.
2016/0029227 A1  1/2016  Aboul-Magd et al.
(Continued)

FOREIGN PATENT DOCUMENTS

CN     105376032 A    3/2016
CN     105393483 A    3/2016
(Continued)

OTHER PUBLICATIONS

International Search Report and Written Opinion of PCT Application No. PCT/JP2020/017981, issued on Jul. 28, 2020, 11 pages of ISRWO.

(Continued)

*Primary Examiner* — Christopher M Crutchfield
(74) *Attorney, Agent, or Firm* — CHIP LAW GROUP

(57) ABSTRACT

The present technology relates to a communication device and a communication method capable for enabling more reliable acknowledgment of data receipt. Further, the present technology provides a communication device including a control unit that performs control to transmit data to a reception-side communication device, when coordinated transmission is performed to transmit the data simultaneously from a plurality of transmission-side communication devices to the reception-side communication device, generate a request signal including coordinated transmission information regarding the coordinated transmission, and acknowledgement return information for returning an acknowledgement of the coordinately transmitted data simultaneously to the plurality of transmission-side communication devices, transmit the generated request signal to the (Continued)

reception-side communication device, and receive an acknowledgement signal including the acknowledgement, the acknowledgement signal being transmitted from the reception-side communication device that has received the request signal. The present technology can be applied to a wireless LAN system, for example.

19 Claims, 29 Drawing Sheets

(56) References Cited

U.S. PATENT DOCUMENTS

| | | | |
|---|---|---|---|
| 2016/0149671 | A1 | 5/2016 | Yang et al. |
| 2017/0367077 | A1 | 12/2017 | Shu et al. |
| 2018/0316476 | A1 | 11/2018 | Sugaya |
| 2019/0132762 | A1 | 5/2019 | Zhu et al. |
| 2020/0021400 | A1* | 1/2020 | Cherian ............... H04L 5/0055 |
| 2021/0127290 | A1* | 4/2021 | Yang ..................... H04W 72/27 |
| 2021/0409075 | A1* | 12/2021 | Yang ..................... H04W 74/04 |
| 2022/0190880 | A1* | 6/2022 | Chitrakar ............... H04B 7/024 |

FOREIGN PATENT DOCUMENTS

| | | |
|---|---|---|
| CN | 105874838 A | 8/2016 |
| DE | 112016003910 T5 | 5/2018 |
| JP | 2009-224850 A | 10/2009 |
| JP | 2011-160121 A | 8/2011 |
| JP | 2014-107613 A | 6/2014 |
| JP | 2017-017430 A | 1/2017 |
| JP | 2017-529774 A | 10/2017 |
| KR | 10-2017-0034410 A | 3/2017 |
| KR | 10-2017-0036714 A | 4/2017 |
| WO | 2015/013985 A1 | 2/2015 |
| WO | 2016/011917 A1 | 1/2016 |
| WO | 2016/029683 A1 | 3/2016 |
| WO | 2017/033531 A1 | 3/2017 |
| WO | 2017/038246 A1 | 3/2017 |
| WO | 2019/087240 A1 | 5/2019 |

OTHER PUBLICATIONS

Ryu, et al., "Consideration on multi-AP coordination for EHT", IEEE 802.11-18/1982 r1, Jan. 9, 2019, slides 1-10.

* cited by examiner

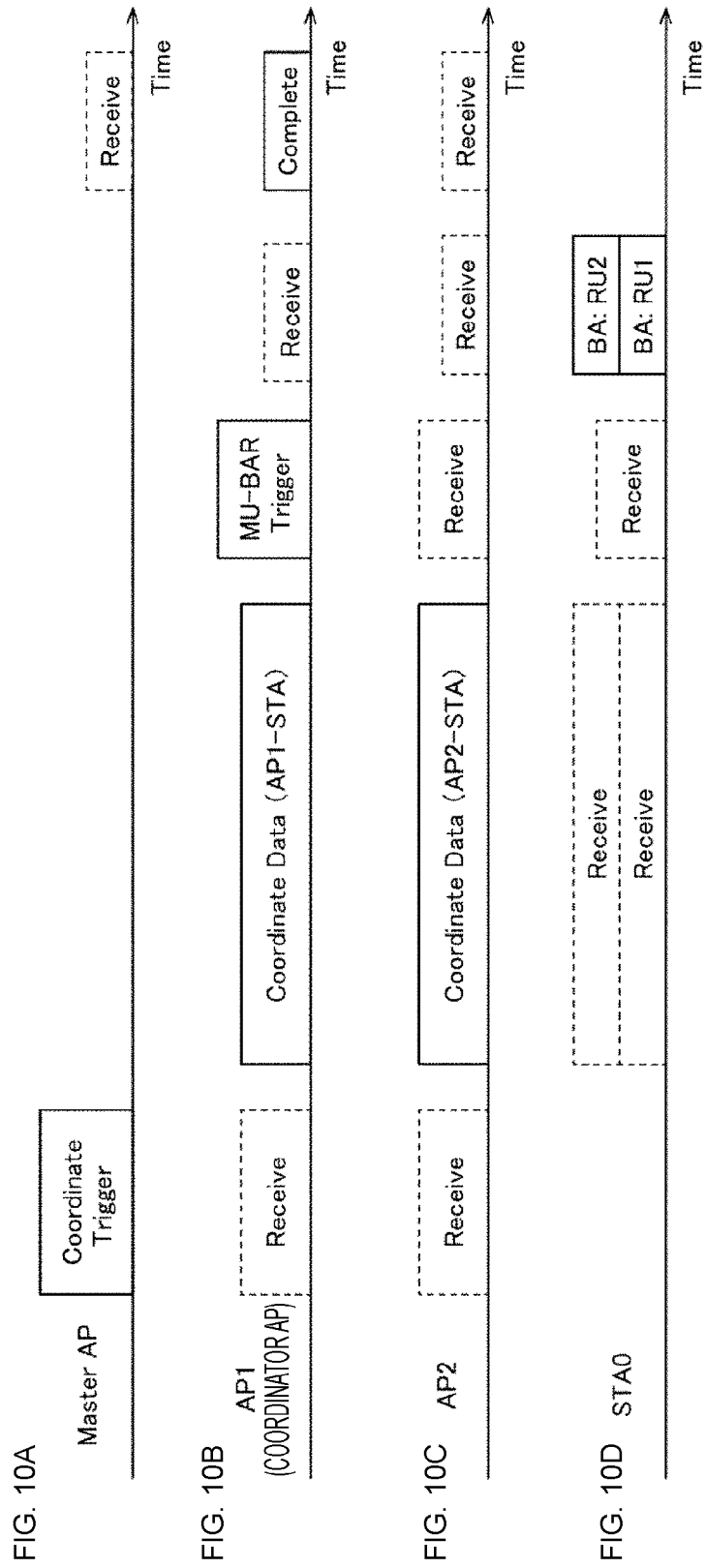

FIG. 12

| Frame Control | Duration | Receive Address | Transmit Address | Coordinate Common Info | Coordinate TX Info | Coordinate User Info | ... | Coordinate User Info | Padding | FCS |
|---|---|---|---|---|---|---|---|---|---|---|

Coordinate Trigger Frame

FIG. 13

| Trigger Type | UL Length | Coordinate Identifier | More TF | CS Required | UL BW | GI and LTF Type | MU-MIMO LTF Mode | Number of HE-LTF Symbols and Mid-amble Periodicity |
|---|---|---|---|---|---|---|---|---|
| UL STBC | LDPC Extra Symbol Segment | AP TX Power | Pre-FEC Padding Factor | PE Disambiguity | UL Spatial Reuse | Doppler | UL HE SIG A2 Reserved | |

Coordinate Common Info

*FIG. 14*

| Coordinate TX Info | | | | | | |
|---|---|---|---|---|---|---|
| Coordinate Block ACK Identifier | Total Length | STA AID | Coordinate Transmit Start Sequence No. | Block ACKBitmap Subfield Length | A-MPDU Order | Coordinate AP Counts | ... |

FIG. 15

| Coordinate User Info | | | | | | |
|---|---|---|---|---|---|---|
| Target AID12 | RU Allocation | Coordinate FEC Coding Type | Coordinate MCS | Coordinate DCM | SS Allocation | Target RSSI | Coordinate Transmit User Information |

| STA AID | Coordinate Transmit Start Sequence No. | Block ACKBitmap Subfield Length | A-MPDU Order | Coordinate AP Counts | ⋯ |
|---|---|---|---|---|---|

FIG. 17

| Frame Control | Duration | Receive Address | Transmit Address | BAR Common Info | Coordinate BAR Info | BAR User Info | ... | BAR User Info | Padding | FCS |
|---|---|---|---|---|---|---|---|---|---|---|
| | | | | Coordinate MU-BAR Trigger Frame | | | | | | |

FIG. 18

| Trigger Type | UL Length | Coordinate Identifier | More TF | CS Required | UL BW | GI and LTF Type | MU-MIMO LTF Mode | Number of HE-LTF Symbols and Mid-amble Periodicity | | |
|---|---|---|---|---|---|---|---|---|---|---|
| | | | | | | | | BAR Common Info | | |
| UL STBC | LDPC Extra Symbol Segment | AP TX Power | Pre-FEC Padding Factor | PE Disambiguity | | UL Spatial Reuse | Doppler | UL HE SIG A2 Reserved | | |

FIG. 19

| Coordinate BAR Info | | | | | |
|---|---|---|---|---|---|
| Coordinate Block ACK Identifier | Total Length | Block ACK Starting Sequence Number | Block ACK Bitmap Subfield length | Combine BA Identifier | Combine AP Counts | Target AP AID | ... |

FIG. 23

| BAR Type | |
|---|---|
| 0 | Basic |
| 1 | Extended Compressed |
| 2 | Compressed |
| 3 | Multi-TID |
| 4-5 | Reserved |
| 6 | GCR |
| 7-9 | Reserved |
| 10 | GLK-GCR |
| 11 | Multi STA |
| 12 | Coordinate Block ACK |
| 13-15 | Reserved |

FIG. 24

|  | BA Type |
|---|---|
| 0 | Basic |
| 1 | Extended Compressed |
| 2 | Compressed |
| 3 | Multi-TID |
| 4-5 | Reserved |
| 6 | GCR |
| 7-9 | Reserved |
| 10 | GLK-GCR |
| 11 | Multi STA |
| 12 | Coordinate Block ACK |
| 13-15 | Reserved | ated on May 10, 2019. Each of the above-referenced applications is hereby incorporated herein by reference in its entirety.

COMMUNICATION DEVICE AND COMMUNICATION METHOD

CROSS REFERENCE TO RELATED APPLICATIONS

This application is a U.S. National Phase of International Patent Application No. PCT/JP2020/017981 filed on Apr. 27, 2020, which claims priority benefit of Japanese Patent Application No. JP 2019-090050 filed in the Japan Patent Office on May 10, 2019. Each of the above-referenced applications is hereby incorporated herein by reference in its entirety.

TECHNICAL FIELD

The present technology relates to a communication device and a communication method, and particularly, to a communication device and a communication method for enabling more reliable acknowledgment of data receipt.

BACKGROUND ART

There is a suggested technique for more reliably delivering data by simultaneously transmitting the same data from a plurality of originator communication devices to one receiver communication device at the same timing.

Although it is possible to realize highly reliable communication by using this kind of technique, it is necessary for the receiver communication device to return an acknowledgement (ACK) so that the originator communication device can confirm appropriate receipt of data at the receiver communication device.

Further, Patent Document 1 discloses a technique for returning an acknowledgement signal (ACK) with a resource unit of orthogonal frequency division multiple access (OFDMA).

CITATION LIST

Patent Document

Patent Document 1: Japanese Patent Application Laid-Open No. 2017-017430

SUMMARY OF THE INVENTION

Problems to be Solved by the Invention

Meanwhile, in a case where data is simultaneously transmitted from a plurality of originator communication devices to one receiver communication device, the receiver communication device needs to return an acknowledgement signal to each of the plurality of originator communication devices, to acknowledge receipt of the data.

However, conventional techniques including the technique disclosed in Patent Document 1 have not established a technique for the receiver communication device to return an acknowledgement signal to each of the plurality of originator communication devices when acknowledging receipt of the data, and therefore, there is a demand for a technique for more reliable acknowledgment of data receipt.

The present technology has been developed in view of such circumstances, and is to enable more reliable acknowledgment of data receipt.

Solutions to Problems

A communication device according to one aspect of the present technology is a communication device including a control unit that performs control to: transmit data to a reception-side communication device, when coordinated transmission is performed to transmit the data simultaneously from a plurality of transmission-side communication devices to the reception-side communication device; generate a request signal including coordinated transmission information regarding the coordinated transmission, and acknowledgement return information for returning an acknowledgement of the coordinately transmitted data simultaneously to the plurality of transmission-side communication devices; transmit the generated request signal to the reception-side communication device; and receive an acknowledgement signal including the acknowledgement, the acknowledgement signal being transmitted from the reception-side communication device that has received the request signal.

A communication method according to one aspect of the present technology is a communication method that is implemented by a communication device, and includes performing control to: transmit data to a reception-side communication device, when coordinated transmission is performed to transmit the data simultaneously from a plurality of transmission-side communication devices to the reception-side communication device; generate a request signal including coordinated transmission information regarding the coordinated transmission, and acknowledgement return information for returning an acknowledgement of the coordinately transmitted data simultaneously to the plurality of transmission-side communication devices; transmit the generated request signal to the reception-side communication device; and receive an acknowledgement signal including the acknowledgement, the acknowledgement signal being transmitted from the reception-side communication device that has received the request signal.

In the communication device and the communication method according to one aspect of the present technology, when coordinated transmission is performed to transmit data simultaneously from a plurality of transmission-side communication devices to a reception-side communication device, the data is transmitted to the reception-side communication device; a request signal is generated, the request signal including coordinated transmission information regarding the coordinated transmission and acknowledgement return information for returning an acknowledgement of the coordinately transmitted data simultaneously to the plurality of transmission-side communication devices; the generated request signal is transmitted to the reception-side communication device; and an acknowledgement signal including the acknowledgement is received, the acknowledgement signal being transmitted from the reception-side communication device that has received the request signal.

A communication device according to one aspect of the present technology is a communication device including a control unit that performs control to: receive data transmitted from a plurality of transmission-side communication devices, when coordinated transmission is performed to transmit the data simultaneously from the plurality of transmission-side communication devices to a reception-side communication device; generate an acknowledgement corresponding to correctly received data of the coordinately transmitted data; receive a request signal transmitted from the transmission-side communication device, the request signal including coordinated transmission information regarding the coordinated transmission and acknowledgement return information for simultaneously returning an acknowledgement of the coordinately transmitted data to the plurality of transmission-side communication devices; and transmit an acknowledgement signal including the generated acknowledgement, on the basis of the received request signal.

A communication method according to one aspect of the present technology is implemented by a communication device, and includes performing control to: receive data transmitted from a plurality of transmission-side communication devices, when coordinated transmission is performed to transmit the data simultaneously from the plurality of transmission-side communication devices to a reception-side communication device; generate an acknowledgement corresponding to correctly received data of the coordinately transmitted data; receive a request signal transmitted from the transmission-side communication device, the request signal including coordinated transmission information regarding the coordinated transmission and acknowledgement return information for simultaneously returning an acknowledgement of the coordinately transmitted data to the plurality of transmission-side communication devices; and transmit an acknowledgement signal including the generated acknowledgement, on the basis of the received request signal.

In the communication device and the communication method according to one aspect of the present technology, when coordinated transmission is performed to transmit data simultaneously from a plurality of transmission-side communication devices to a reception-side communication device, the data transmitted from the plurality of transmission-side communication devices is received; an acknowledgement corresponding to correctly received data of the coordinately transmitted data is generated; a request signal transmitted from the transmission-side communication device is received, the request signal including coordinated transmission information regarding the coordinated transmission and acknowledgement return information for simultaneously returning an acknowledgement of the coordinately transmitted data to the plurality of transmission-side communication devices; and an acknowledgement signal including the generated acknowledgement is transmitted, on the basis of the received request signal.

Note that a communication device according to one aspect of the present technology may be an independent device or may be an internal block forming one device.

BRIEF DESCRIPTION OF DRAWINGS

FIGS. 10A, 10B, 10C, and 10D are diagrams showing the transmission/reception relationship in each communication device.

FIG. 12 is a diagram showing an example configuration of a coordinated transmission trigger frame.

FIG. 13 is a diagram showing an example configuration of a Coordinate Common Info subfield of a coordinated transmission trigger frame.

FIG. 14 is a diagram showing an example configuration of a Coordinate TX Info subfield of a coordinated transmission trigger frame.

FIG. 15 is a diagram showing an example configuration of a Coordinate User Info subfield of a coordinated transmission trigger frame.

FIG. 17 is a diagram showing an example configuration of an ACK request trigger frame.

FIG. 18 is a diagram showing an example configuration of a BAR Common Info subfield of an ACK request trigger frame.

FIG. 19 is a diagram showing an example configuration of a Coordinate BAR Info subfield of an ACK request trigger frame.

FIG. 23 is a diagram showing an example value of a BAR Type field.

FIG. 24 is a diagram showing an example value of a BA Type field.

MODE FOR CARRYING OUT THE INVENTION

Figure 1:
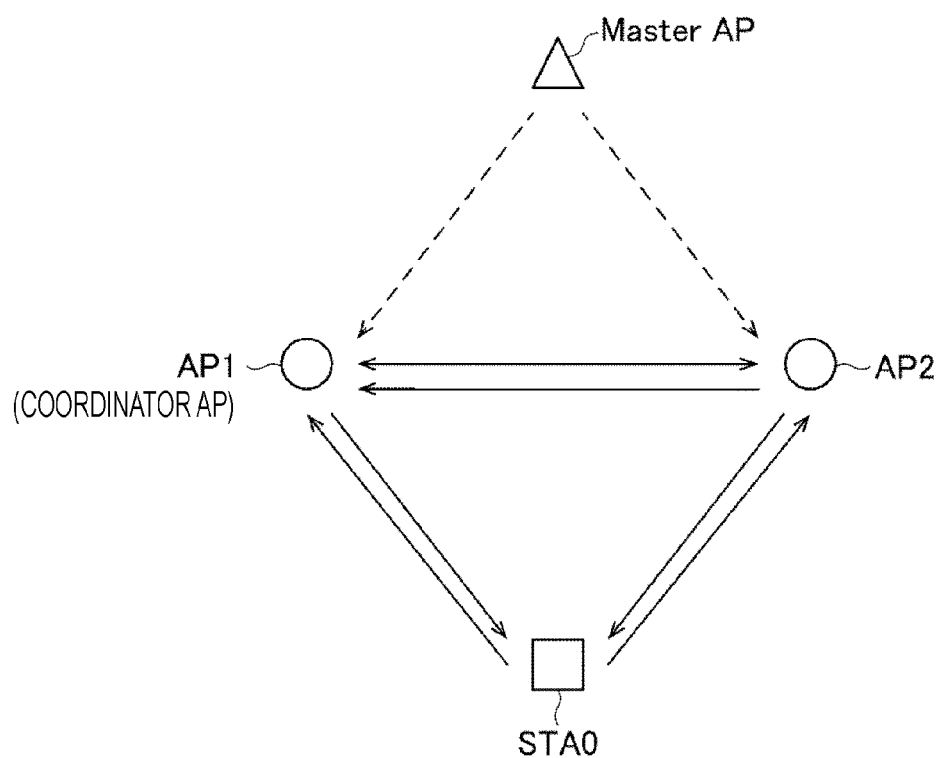
FIG. 1 is a diagram showing a first example of the layout of communication devices constituting a wireless network to which the present technology is applied.

The following is a description of embodiments of the present technology, with reference to the drawings. Note that explanation will be made in the following order.
1. Embodiments of the present technology
2. Modifications 1. Embodiments of the Present Technology By the technology of uplink multiuser MIMO (Multiple-Input and Multiple-Output) communication, a technique for spatially multiplexing and transmitting signals of different information from a plurality of originator communication devices to one receiver communication device has been put into practical use.

In a case where this uplink multiuser MIMO communication is used, each originator communication device sets transmission parameters so that one receiver communication device receives signals from a plurality of originator communication devices. Thus, communication is realized.

Also, there is a suggested communication method for more reliably delivering data by simultaneously transmitting the same data from a plurality of access points (APs) to one communication terminal (STA: Station) at the same timing.

By using this communication method, it is possible to realize highly reliable data communication. However, in order for an access point to confirm that data has been correctly delivered to a communication terminal, the communication terminal needs to return an acknowledgement (ACK) frame (hereinafter also referred to as an ACK frame) after receiving the data.

In recent years, the technology of uplink OFDMA multiplex communication has been suggested for allocating resources to a plurality of communication devices and simultaneously receiving signals, using orthogonal frequency resources based on orthogonal frequency division multiple access (OFDMA).

According to this technology, the transmission parameters of the frames to be transmitted from a plurality of originator communication devices to a receiver communication device are controlled, so that data can be simultaneously received.

Meanwhile, to acknowledge data receipt after the same data is simultaneously transmitted from a plurality of originator communication devices to a receiver communication device, the receiver communication device needs to return an ACK frame to each of the plurality of originator communication devices.

Normally, when an ACK frame addressed to each originator communication device is transmitted, the transmission timing needs to be shifted timewise, and this frame exchange requires a large amount of time.

That is, since an ACK frame needs to be returned to each of the communication devices as originators of different pieces of data, uplink multiuser MIMO communication needs to be performed in conjunction with reception at a plurality of receiver communication devices.

Further, in a case where uplink OFDMA multiplex communication is used, signals are transmitted from a plurality of communication terminals to one access point, and therefore, it is necessary for each communication terminal to set transmission parameters optimized for reception at the one access point.

Because of this, it is difficult to set optimal parameters that can be received by a plurality of access points in a case where coordinated transmission is performed. Here, coordinated transmission means that a plurality of access points cooperates to simultaneously transmit data to a plurality of communication terminals.

Alternatively, in a configuration in which an ACK frame is returned only to the access point that determines retransmission control of coordinately transmitted data, there is a problem that another access point dependent on the access point cannot identify the data that needs to be retransmitted.

Furthermore, Patent Document 1 described above discloses a technique for returning acknowledgement signals (ACK) with a resource unit of OFDMA. However, there is problem that, by OFDMA, ACK frames for a plurality of originator communication devices cannot be returned, though an ACK frame for a single originator communication device can be returned.

The present technology solves the above problems, and suggests a communication method (novel system) for more reliable acknowledgment of data receipt.

Specifically, in the communication method (novel system) to which the present technology is applied, a plurality of transmission-side communication devices (a plurality of access points, for example) cooperates and simultaneously transmits data (an A-MPDU frame, for example) to one reception-side communication device (a communication terminal, for example). By the method for acknowledging receipt of the data, acknowledgement signals (block ACK frames, for example) from the reception-side communication device are simultaneously distributed and transmitted by the technology of simultaneous multiplex access (the technology of OFDMA, for example), so that the acknowledgement signals can be reliably returned to the respective transmission-side communication devices.

That is, in the reception-side communication device (a communication terminal, for example), acknowledgement signals (block ACK frames, for example) indicating whether coordinately transmitted data (an A-MPDU frame, for example) has been correctly received can be simultaneously transmitted to a plurality of transmission-side communication devices (a plurality of access points, for example) by the technology of uplink OFDMA multiplex communication.

In the description below, the communication method (novel system) to which the present technology is applied is explained in detail, with reference to the drawings.

(Example Configuration of a Wireless Network)

FIG. 1 is a diagram showing a first example of the layout of communication devices constituting a wireless network to which the present technology is applied.

In FIG. 1, circles (○), a triangle (△), and a square (□) in the drawing indicate the positions of the respective communication devices of access points AP, a master access point AP (Master AP), and a communication terminal STA. Also, in FIG. 1, arrows between the respective communication devices indicate data flows corresponding to the orientations of the arrows, and indicate that communication is performed between the respective communication devices.

Here, a plurality of access points AP1 and AP2 exists as communication devices forming the wireless network, and coordinated transmission from the plurality of access points AP1 and AP2 is performed while a communication terminal STAG is connected to these access points AP1 and AP2.

Also, in FIG. 1, the access point AP1, which is one of the plurality of access points AP1 and AP2, is a coordinator AP. Here, a coordinator AP is an access point AP having a function of performing control as a coordinator (hereinafter also referred to as a coordinator access point AP) when performing coordinated transmission.

Alternatively, as shown in FIG. 1, a master access point AP (Master AP) serving as a master that controls the plurality of access points AP1 and AP2 may be provided, and the master access point AP may instruct the plurality of access points AP1 and AP2 to perform coordinated transmission.

With this arrangement, the data to be transmitted to the communication terminal STAG is shared between the access points AP1 and AP2 beforehand, and a trigger for performing coordinated transmission is set in accordance with an instruction of the coordinator access point AP1 or the master access point AP.

Coordinated transmission is then performed by the plurality of access points AP1 and AP2, and the communication terminal STAG that receives the data returns an acknowledgment of receipt of the coordinately transmitted data as an ACK frame to both the access points AP1 and AP2.

Specifically, in FIG. 1, the coordinator access point AP1 is designed to determine the coordinated transmission data (retransmission data) to be retransmitted, and the coordinator access point AP1 designates the wireless communication resource for returning an ACK frame. That is, since whether to provide the master access point AP is optional, the arrows indicating the data flows are shown with dashed lines in FIG. 1.

Figure 2:
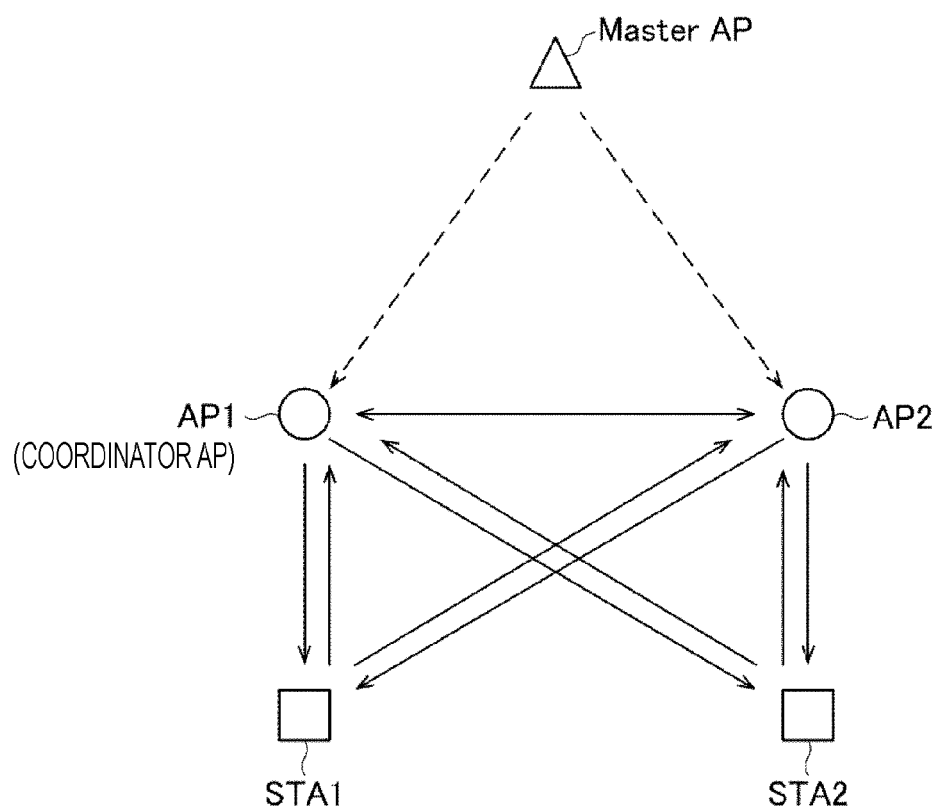
FIG. 2 is a diagram showing a second example of the layout of communication devices constituting a wireless network to which the present technology is applied.

Further, FIG. 2 is a diagram showing a second example of the layout of communication devices constituting a wireless network to which the present technology is applied.

In FIG. 2, the access points AP1 and AP2 are arranged in a manner similar to that in FIG. 1, but a plurality of communication terminals STA1 and STA2 is connected thereto, instead of the single communication terminal STAG. That is, this example corresponds to a case where the communication terminal STA1 is connected to the access point AP1, and the communication terminal STA2 is connected to the access point AP2.

Further, in FIG. 2, the access point AP1 and the access point AP2 are disposed in a mutually communicable state. Furthermore, the access point AP1 is located at a position at which it is possible to communicate with the communication terminal STA2, and the access point AP2 is located at a position at which it is possible to communicate with the communication terminal STA1.

With this arrangement, the plurality of access points AP1 and AP2 can perform communication with the plurality of communication terminals STA1 and STA2.

In such a configuration, it is necessary to return a data receipt acknowledgment as an ACK frame from the communication terminal STA1 to the access point AP1, and from the communication terminal STA2 to the access point AP2.

As described above, the communication terminals STA1 and STA2 are originally designed to return a data receipt acknowledgment as an ACK frames to both the access points AP1 and AP2. That is, the wireless communication resource for returning an ACK frame from the communication terminal STA2 to the access point AP2 is designated by the coordinator access point AP1.

Further, since the determination as to retransmission control of coordinately transmitted data is performed by the coordinator access point AP1, the coordinator access point AP1 needs information about the ACK frame returned from the communication terminal STA2 to the access point AP2. Therefore, the communication terminal STA2 needs to deliver the information about the ACK frame not only to the access point AP2 but also to the coordinator access point AP1.

(Example of a Data Sequence)

Figure 3:
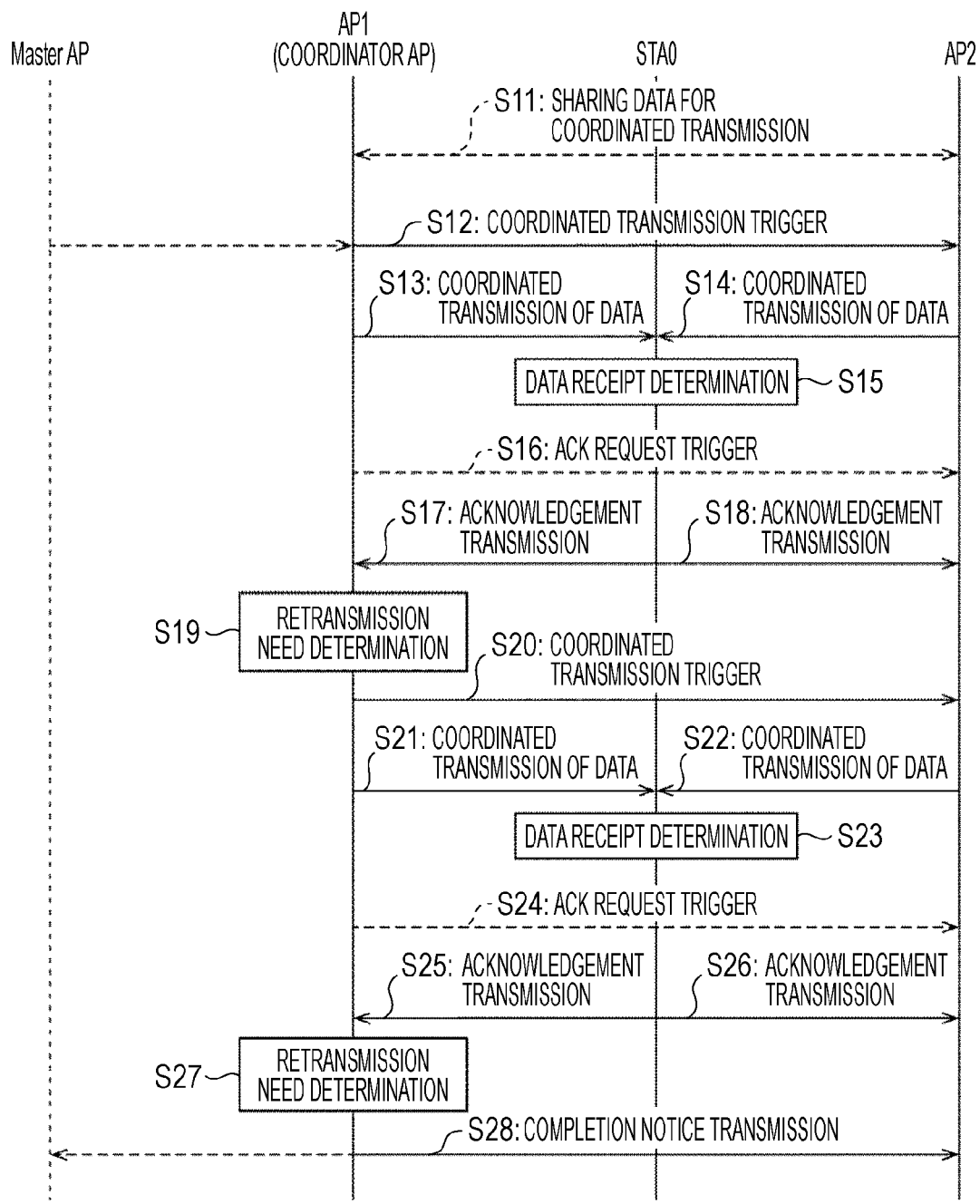
FIG. 3 is a chart showing a flow in a data sequence between the respective communication devices.

FIG. 3 is a chart showing a flow in a data sequence between the respective communication devices.

FIG. 3 shows a flow in a data sequence when the communication terminal STAG exists in the configuration of the wireless network shown in FIG. 1, which is a case where the coordinator access point AP1 and the access point AP2 are provided as the plurality of access points AP. FIG. 3 also shows a state of transition from the top to the bottom in the drawing with the lapse of time.

However, whether to provide the master access point AP is also optional in FIG. 3, and therefore, the sequence related to the master access point AP is shown by dashed lines. Further, the sequence not directly related to the present technology is also shown by dashed lines.

First, FIG. 3 is based on the assumption that an operation of sharing data for performing coordinated transmission toward the communication terminal STAG is performed beforehand between the coordinator access point AP1 and the access point AP2 (S11).

Here, to perform coordinated transmission of data, a coordinated transmission trigger frame is transmitted from the coordinator access point AP1 or the master access point AP (S12). The coordinator access point AP1 and the access point AP2 simultaneously perform coordinated transmission of the same data to the communication terminal STAG, in accordance with the coordinated transmission trigger frame (S13 and S14).

The communication terminal STAG that has received the coordinately transmitted data then decodes the data received from the respective access points AP (AP1 and AP2), and determines receipt of the data (S15).

After that, an ACK request trigger frame for requesting a return of an acknowledgement (ACK) is transmitted from the coordinator access point AP1 as necessary (S16). Accordingly, when the ACK request trigger frame is transmitted, the communication terminal STAG performs a process according to the ACK request trigger frame. Specifically, the communication terminal STAG transmits an ACK frame including an acknowledgement to each of the access points AP (AP1 and AP2), in accordance with resource information (information regarding the resource allocation for the block ACK frames to be returned later through OFDMA) obtained from the ACK request trigger frame (S17 and S18).

Note that, as described later in detail, a request (trigger) for a return of an acknowledgement (ACK) is not necessarily an ACK request trigger frame, and some other format such as a format included in the header information of a data frame may be used, for example.

Further, the coordinator access point AP1 that has received the ACK frame determines whether data retransmission is necessary (S19). If it is determined that data retransmission is necessary in this determination process, the coordinator access point AP1 designates the data to be retransmitted, and transmits a coordinated transmission trigger frame for performing coordinated transmission of the retransmission data (S20).

The access point AP2 that has received the coordinated transmission trigger frame performs coordinated transmission of the retransmission data to the communication terminal STAG at the same time as the coordinator access point AP1 (S21 and S22).

The communication terminal STAG that has received the coordinately transmitted data then decodes the data received from the respective access points AP (AP1 and AP2), and performs data receipt determination (S23). When an ACK request trigger frame is transmitted from the coordinator access point AP1 (S24), the communication terminal STAG performs a process corresponding to the ACK request trigger frame. As a result, the communication terminal STAG transmits an ACK frame to the respective access points AP (AP1 and AP2), in accordance with resource information (S25 and S26).

The coordinator access point AP1 that has received this ACK frame determines whether data retransmission is necessary (S27). If it is determined that data retransmission is unnecessary, a completion notice (Complete notice) is transmitted (S28). This completion notice is designed to notify the other access point AP2 or the master access point AP that the coordinated transmission has been completed.

If it is determined that data retransmission is necessary also in this step, coordinated transmission of retransmission data is only required to be performed again in a manner similar to that in S20 to S26 described above.

Note that, through the data sequence in FIG. 3, a case where a single communication terminal STAG is present has been described. However, in a case where the wireless network configuration shown in FIG. 2 in which the plurality of communication terminals STA1 and STA2 is present is applied to the data sequence in FIG. 3, a configuration in which two communication terminals STAG are present is conceivable in FIG. 3. That is, although detailed explanation is not made herein, when an ACK request trigger frame is transmitted from the coordinator access point AP1, for example, the respective communication terminals STA1 and STA2 return an ACK frame at the same time.

(Example Configurations of ACK Frame Return Triggers)

Figure 4:
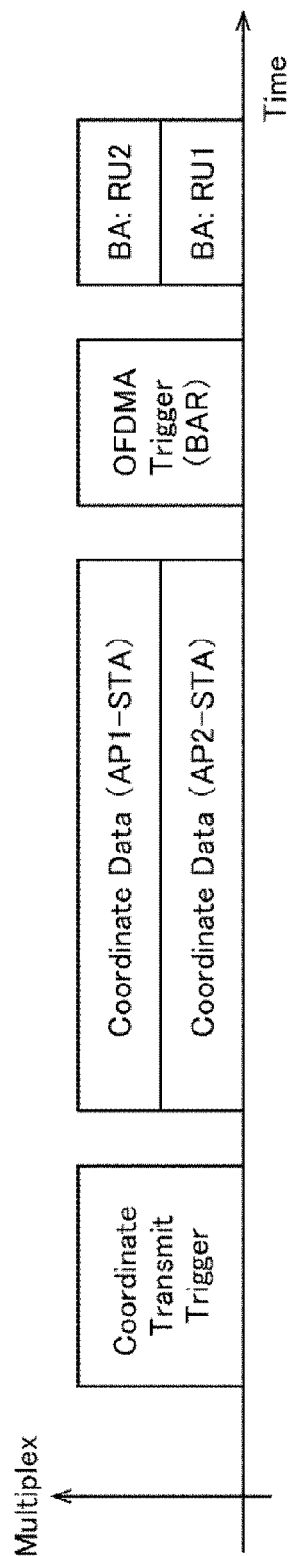
FIG. 4 is a diagram showing a first example configuration of an ACK frame return trigger.
Figure 5:
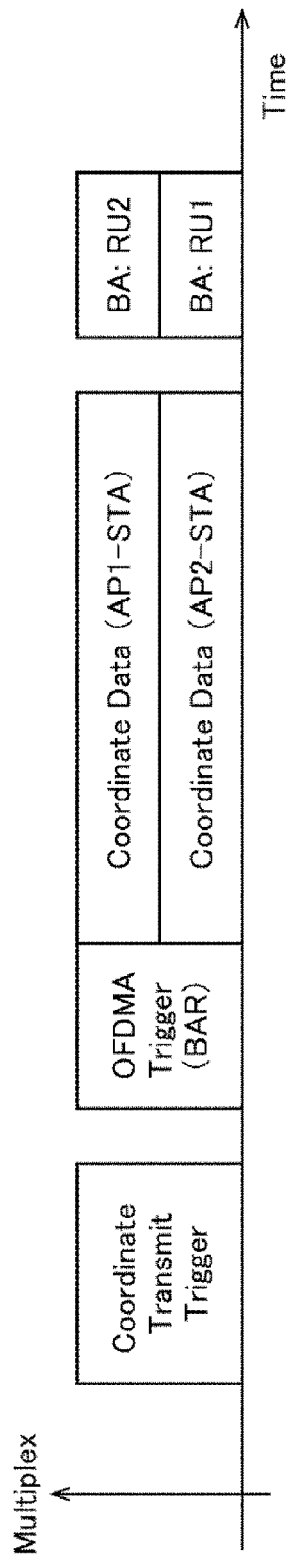
FIG. 5 is a diagram showing a second example configuration of an ACK frame return trigger.
Figure 6:
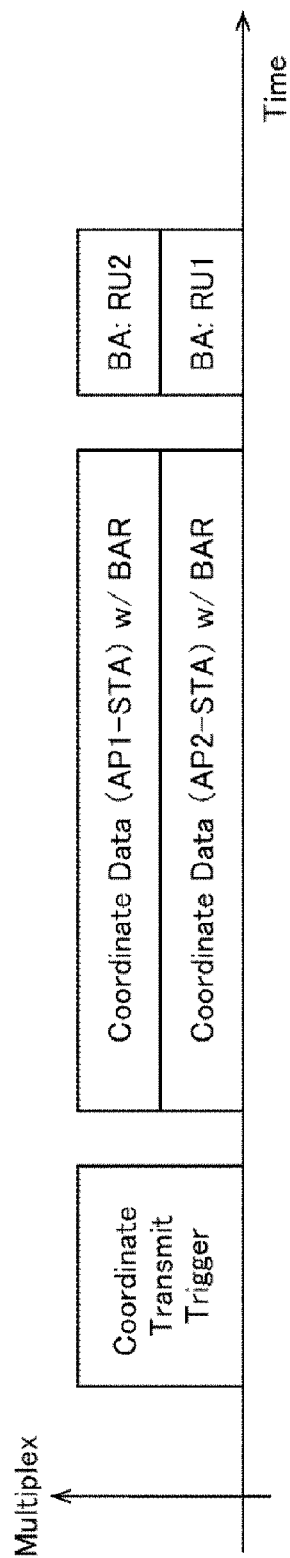
FIG. 6 is a diagram showing a third example configuration of an ACK frame return trigger.

Next, referring to FIGS. 4 to 6, example configurations of ACK frame return triggers are described. Note that, in FIGS. 4 to 6, the ordinate axis indicates the number of multiplexes (Multiplex), and the abscissa axis indicates time (Time).

FIG. 4 shows an example case where an ACK frame return trigger is formed as an independent trigger frame.

In FIG. 4, in accordance with a coordinated transmission trigger frame (Coordinate (Transmit) Trigger Frame) from the coordinator access point AP1, for example, a data frame (Coordinate Data (AP1-STA)) from the coordinator access point AP1 and a data frame (Coordinate Data (AP2-STA)) from the access point AP2 are coordinately transmitted to the communication terminal STAG.

An ACK request trigger frame is then transmitted as an ACK frame return trigger (OFDMA Trigger (BAR: Block Ack Request). This ACK request trigger frame is transmitted from the coordinator access point AP1, for example. Further, resource information is written in the ACK request trigger frame.

The communication terminal STAG that has received the ACK request trigger frame then generates a block ACK frame (BA: RU1) addressed to the coordinator access point AP1 and a block ACK frame (BA: RU2) addressed to the access point AP2, in accordance with determination of receipt of the coordinately transmitted data frames (Coordinate Data (AP1-STA) and Coordinate Data (AP2-STA)). The communication terminal STAG multiplexes these block ACK frames by different OFDMAs from each other, and simultaneously returns the results.

As described above, in the example shown in FIG. 4, an ACK request trigger frame is independently transmitted immediately before block ACK frames are returned through OFDMA multiplex communication. Thus, in a case where the access points AP are to receive ACK frame returns from a plurality of communication terminals STA, for example, synchronization can be effectively established.

Note that, in the above data sequence shown in FIG. 3, a request (trigger) for returning an acknowledgement (ACK) is transmitted as the ACK request trigger frame shown in FIG. 4.

FIG. 5 shows an example case where an ACK frame return trigger is aggregated in data.

In FIG. 5, data frames are coordinately transmitted from the coordinator access point AP1 and the access point AP2 to the communication terminal STAG, in accordance with a coordinated transmission trigger frame, in a manner similar to that in FIG. 4 described above.

In FIG. 5, however, resource information is transmitted in a format temporally continuous with the data frames to be coordinately transmitted. In the example shown in FIG. 5, following an ACK frame return trigger (OFDMA Trigger (BAR)) in which resource information is written, data frames (Coordinate Data (AP1-STA) and Coordinate Data (AP2-STA)) are aggregated to become temporally continuous with each other, and are then transmitted.

The communication terminal STAG that has received the ACK frame return trigger then generates block ACK frames (BA: RU1 and BA: RU2) addressed to the respective access points AP (AP1 and AP2), multiplexes the block ACK frames by different OFDMAs, and simultaneously returns the block ACK frames.

As described above, in the example in FIG. 5, the elements of an ACK request trigger frame are multiplexed into the data frames to be coordinately transmitted. Accordingly, this example is regarded as an effective method in a case where transmission is performed with the use of some resource when downlink OFDMA multiplex communication is conducted, for example.

FIG. 6 shows an example case where an ACK frame return trigger (parameter) is formed as the header information of a data frame or the like.

In FIG. 6, data frames are coordinately transmitted from the coordinator access point AP1 and the access point AP2 to the communication terminal STAG, in accordance with a coordinated transmission trigger frame, in a manner similar to those in FIGS. 4 and 5 described above.

In FIG. 6, resource information is also transmitted in a format temporally continuous with the data frame to be coordinately transmitted, as in FIG. 5 described above. In this example, however, the resource information (w/BAR) is written in the header information in the data frames (Coordinate Data (AP1-STA) and Coordinate Data (AP2-STA)). For example, the resource information can be written as an ACK frame return trigger (parameter) in QoS control, EHT control, or the like in the header information.

Note that the ACK frame return trigger (parameter) is not necessarily stored in the header information of data frames, but may be stored as some other information.

As described above, in the example in FIG. 6, it is possible to adopt a configuration in which the resource information for returning a block ACK frame to the coordinator access point AP1 and the access point AP2 can be obtained from the communication terminal STAG, even if an obvious trigger frame is not transmitted.

That is, the ACK frame return trigger in FIG. 5 is transmitted continuously with the data frames, and the ACK frame return trigger (parameter) in FIG. 6 is included in (the header information in) the data frames to be transmitted. However, both triggers can be regarded as being transmitted at the same time as the data frames to be coordinately transmitted.

(Example Configuration of a Communication Device)

Figure 7:
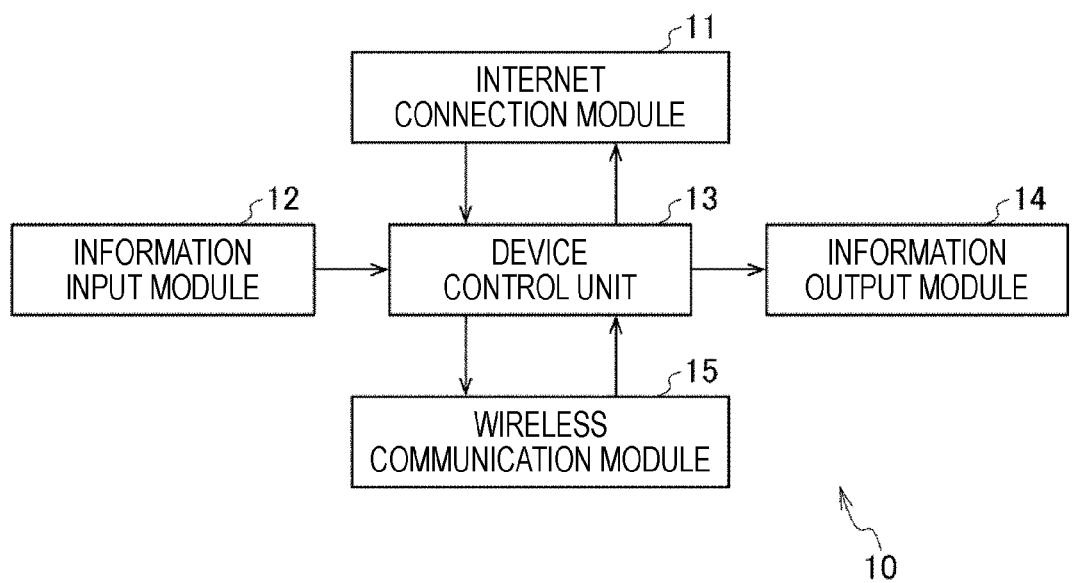
FIG. 7 is a block diagram showing an example configuration of a communication device to which the present technology is applied.

FIG. 7 is a block diagram showing an example configuration of a communication device (a wireless communication device) to which the present technology is applied.

Note that a communication device 10 shown in FIG. 7 corresponds to a transmission-side communication device (hereinafter also referred to as a transmission-side communication device 10Tx as appropriate) that is formed as an access point AP in a wireless network (FIG. 1), or to a reception-side communication device (hereinafter also referred to as a reception-side communication device 10Rx as appropriate) that is formed as the communication terminal STA.

In FIG. 7, the communication device 10 includes an Internet connection module 11, an information input module 12, a device control unit 13, an information output module 14, and a wireless communication module 15.

The Internet connection module 11 includes a circuit having, as an access point AP, a function for connecting from an optical fiber network or some other communication line to the Internet network via a service provider, a peripheral circuit thereof, a microcontroller, a semiconductor memory, and the like, for example.

The Internet connection module 11 performs various kinds of processing related to Internet connection, under the control of the device control unit 13. For example, the Internet connection module 11 has a configuration in which the functions of a communication modem or the like for connecting to the Internet network are installed in a case where the communication device 10 operates as an access point AP.

The information input module 12 is formed with an input device such as push buttons, a keyboard, or a touch panel, for example. The information input module 12 has a function of inputting instruction information corresponding to an instruction from a user, to the device control unit 13.

The device control unit 13 is formed with a microprocessor, a microcontroller, or the like, for example. The device control unit 13 controls the respective components (modules) to cause the communication device 10 to operate as an access point AP or the communication terminal STA.

The device control unit 13 performs various kinds of processing on information supplied from the Internet connection module 11, the information input module 12, or the wireless communication module 15. The device control unit 13 also supplies the information obtained as a result of processing performed by itself, to the Internet connection module 11, the information output module 14, or the wireless communication module 15.

For example, at a time of data transmission, the device control unit 13 supplies transmission data passed from an application or the like of a protocol upper layer, to the wireless communication module 15. Also, at a time of data reception, the device control unit 13 passes reception data supplied from the wireless communication module 15 on to an application or the like of a protocol upper layer.

The information output module 14 is formed with an output device that includes a display element such as a liquid crystal display (LCD), an organic EL display (OLED: Organic Light Emitting Diode), or a light emitting diode (LED) display, and a speaker or the like that outputs voice and music, for example.

The information output module 14 has a function of displaying information necessary to the user, on the basis of the information supplied from the device control unit 13. Here, the information to be processed by the information output module 14 includes an operating state of the communication device 10, and information obtained via the Internet network, for example.

The wireless communication module 15 is formed with a wireless chip, a peripheral circuit, a microcontroller, a semiconductor memory, and the like, for example. The wireless communication module 15 performs various kinds of processing related to wireless communication, under the control of the device control unit 13. The configuration of the wireless communication module 15 will be described later in detail, with reference to FIG. 8.

Note that, although a wireless communication module on which a wireless communication chip, peripheral circuits, and the like are mounted is described as an example herein, the present technology can be applied not only to a wireless communication module, but also to a wireless communication chip, a wireless communication LSI, and the like, for example. Further, whether to include an antenna is optional in a wireless communication module.

Also, in the communication device 10 shown in FIG. 7, the device control unit 13 and the wireless communication module 15 are essential components, but whether to include the other modules, which are the Internet connection module 11, the information input module 12, and the information output module 14, as components is optional.

That is, each individual communication device 10 operating as an access point AP or the communication terminal STA can be formed only with necessary modules, and unnecessary portions can be simplified or excluded.

More specifically, the Internet connection module 11 can be incorporated only in an access point AP, and the information input module 12 and the information output module 14 can be incorporated only in the communication terminal STA, for example.

(Example Configuration of the Wireless Communication Module)

Figure 8:
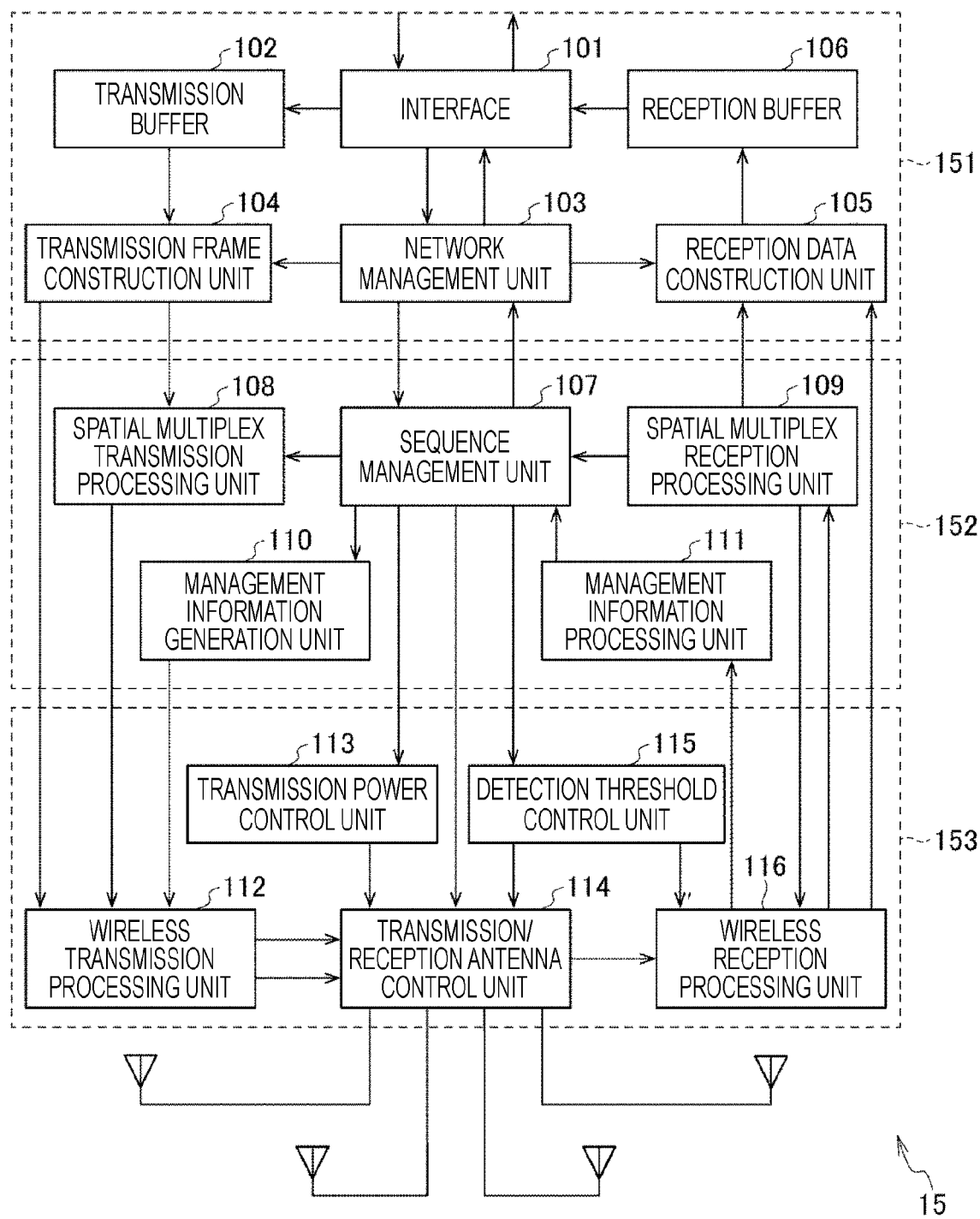
FIG. 8 is a block diagram showing an example configuration of a wireless communication module.

FIG. 8 is a block diagram showing an example configuration of the wireless communication module 15 shown in FIG. 7.

In the wireless communication module 15, an interface 101, a transmission buffer 102, a network management unit 103, a transmission frame construction unit 104, a reception data construction unit 105, and a reception buffer 106 are formed as common software portions of communication devices (wireless communication modules) compatible with conventional wireless LAN systems.

The wireless communication module 15 also includes a sequence management unit 107, a spatial multiplex transmission processing unit 108, a spatial multiplex reception processing unit 109, a management information generation unit 110, and a management information processing unit 111 as characteristic components compatible with the novel system.

Further, in the wireless communication module 15, a wireless transmission processing unit 112, a transmission power control unit 113, a transmission/reception antenna control unit 114, a detection threshold control unit 115, and a wireless reception processing unit 116 are formed as common baseband processing portions of communication devices (wireless communication modules) compatible with conventional wireless LAN systems.

The interface 101 is formed with an input/output interface circuit or the like, for example. The interface 101 is an interface for exchanging data with the device control unit 13 (FIG. 7), and has a function for exchanging information input thereto and information output therefrom in a predetermined signal format.

The interface 101 writes transmission data input from the device control unit 13, into the transmission buffer 102. The interface 101 also supplies information input from the device control unit 13 to the network management unit 103, or outputs information supplied from the network management unit 103 to the device control unit 13.

The transmission buffer 102 is formed with a semiconductor memory device such as a buffer memory, for example. The transmission buffer 102 temporarily stores the transmission data written via the interface 101.

The network management unit 103 has a function of managing address information and the like about the communication device 10 in the wireless network.

In a case where the communication device 10 operates as an access point AP, the network management unit 103 manages the communication terminal STA connected thereto. In a case where the communication device 10 operates as the communication terminal STA, on the other hand, the network management unit 103 manages the access points AP connected thereto.

Furthermore, in a case where the communication device 10 operates as an access point AP, the network management unit 103 has a function of recognizing the presence of other access points AP existing in the surroundings, and may operate in cooperation with these other access points AP as necessary.

The transmission frame construction unit 104 has a function of reading the transmission data stored in the transmission buffer 102 and constructing the transmission data as a data frame to be transmitted by wireless communication. For example, the transmission frame construction unit 104 constructs an A-MPDU frame by collecting a plurality of MPDUs stored in the transmission buffer 102.

The reception data construction unit 105 has a function of removing predetermined header information from a received data frame and extracting only the necessary data portion. For example, the reception data construction unit 105 removes the header information from an A-MPDU frame, extracts the MPDUs, and extracts the necessary data portion. The data portion extracted by the reception data construction unit 105 is written into the reception buffer 106.

The reception buffer 106 is formed with a semiconductor memory device such as a buffer memory, for example. The reception buffer 106 is a buffer for temporarily storing extracted portions until all data is collected on the basis of the sequence, and is designed to store data until the time to output reception data to the device control unit 13 (a connected application device, for example) comes.

When the time to output reception data comes, the reception data stored in the reception buffer 106 is then read out as appropriate, and is output to the device control unit 13 via the interface 101.

The sequence management unit 107 has the functions of a coordinated transmission management unit that manages coordinated transmission to which the present technology is applied.

In a case where the communication device 10 operates as an access point AP, the sequence management unit 107 determines whether a coordinated transmission operation is possible, and sets various parameters and the like.

Specifically, in a case where the communication device 10 operates as the master access point AP or the coordinator access point AP, transmission of frames such as a trigger frame and an end frame for performing coordinated transmission of data is controlled. In a case where the communication device 10 operates as some other access point AP, on the other hand, reception of a trigger frame, transmission of an end frame, and the like are controlled.

Further, in a case where the communication device 10 operates as the communication terminal STA, the sequence management unit 107 performs various settings for receiving data to be coordinately transmitted, by receiving frames such as a trigger frame and an end frame.

That is, in a case where an ACK request trigger frame is received, the sequence management unit 107 extracts the sequence number information about the data that has been successfully received, and controls the management information generation unit 110 to construct a block ACK frame in accordance with the resource information written in the ACK request trigger frame.

The spatial multiplex transmission processing unit 108 has a function of setting the number of spatial multiplexes necessary for performing spatial multiplex transmission simultaneously for a plurality of spatial multiplex streams, and setting various parameters necessary for transmission of spatial multiplex streams, for example.

Specifically, the spatial multiplex transmission processing unit 108 sets spatial multiplex streams for performing coordinated transmission, and performs necessary parameter settings each time in a case where data multiplexed with data addressed to another communication terminal STA is to be transmitted. Further, the spatial multiplex transmission processing unit 108 performs control for matching the timing of coordinated transmission with an adjacent access point AP, and transmitting necessary parameters in synchronization.

The spatial multiplex reception processing unit 109 has a function of setting the number of spatial multiplexes necessary for simultaneously receiving a plurality of spatial multiplex streams, and setting various parameters necessary for reception of spatial multiplex streams, for example.

Specifically, the spatial multiplex reception processing unit 109 performs control for extracting the spatial multiplex streams that needs to be received by itself, from the spatial multiplex streams transmitted from the access points AP. Here, control is performed to recognize that the same data is transmitted from different access points AP, combine the received data as necessary, and construct reception data.

Note that, in a case where the communication device 10 operates as the communication terminal STA, the spatial multiplex reception processing unit 109 extracts coordinately transmitted data, determines whether each piece of the data has been correctly decoded, supplies the correctly decoded data to the reception data construction unit 105, and supplies the sequence number thereof to the sequence management unit 107.

The management information generation unit 110 has a function of constructing a signal necessary for network management, and a control frame necessary for a communication control protocol.

In a case where the communication device 10 operates as an access point AP, the management information generation unit 110 generates frames such as a coordinated transmission trigger frame, an ACK request trigger frame, and an end frame. In a case where the communication device 10 operates as the communication terminal STA, on the on the other hand, the management information generation unit 110 generates a block ACK frame, in accordance with resource information (information regarding the resource allocation for the block ACK frames to be returned later by OFDMA) written in an ACK request trigger frame.

The management information processing unit 111 has a function of constructing control information necessary for the communication control protocol in a case where a received frame is a control frame. The management information processing unit 111 also has a function of notifying the sequence management unit 107 and the network management unit 103 of the parameters written in a received frame and setting transmission parameters in a case where the received frame is a trigger frame.

Here, in a case where the communication device 10 operates as the communication terminal STA, when a received frame is an ACK request trigger frame, the management information processing unit 111 extracts the resource information written therein, and recognizes the resource allocated to itself. This resource information is supplied to the management information generation unit 110 via the sequence management unit 107, and a block ACK frame is generated therein.

Further, in a case where the communication device 10 operates as an access point AP, when a received frame is a block ACK frame, the management information processing unit 111 notifies the sequence management unit 107 of the parameters of information as to which receipt has been acknowledged through the block ACK frame. As a result, the data to be retransmitted is recognized.

The wireless transmission processing unit 112 has a function of adding a predetermined preamble signal to information about a data frame or the like to be wirelessly transmitted in a predetermined frequency channel, and processing the information as an analog signal by converting the information into a baseband signal in a predetermined format.

Note that the wireless transmission processing unit 112 is formed as one element in this example. However, in a case where a plurality of spatial multiplex streams is handled, a plurality of elements may operate in parallel, to simultaneously transmit the respective spatial multiplex streams. As described above, signals of different spatial multiplex streams may be supplied from a plurality of processing units to a transmission antenna.

The transmission power control unit 113 has a function of controlling transmission power so that no signals reach any unnecessary radio wave range in a case where a predetermined frame is transmitted. Here, the transmission power control unit 113 has a function of performing control to adjust the minimum necessary transmission power and transmit data so that signals with the intended reception field strength reach the receiver communication device 10.

The transmission/reception antenna control unit 114 has a configuration to which a plurality of antenna elements is connected. The transmission/reception antenna control unit 114 performs control to transmit (wirelessly transmit) a signal as a spatial multiplex stream, and control to receive (wirelessly receive) a signal transmitted as a spatial multiplex stream.

The detection threshold control unit 115 has a function of performing control to set a signal detection level at which signals from the communication device 10 present in the region can be detected, or, in this example, signals can be detected with the minimum detection threshold, in a case where the transmission power control unit 113 has performed transmission power control. If there is a frequency channel currently being used, the detection threshold control unit 115 then detects a signal equal to or higher than the predetermined detection level.

The wireless reception processing unit 116 has a function of performing a reception process to separate individual streams from one another and receive the header and the data portion added after a predetermined preamble signal, in a case where the predetermined preamble signal has been detected.

Note that, in FIG. 8, arrows between the respective blocks indicate flows and control of data (signals), and each block operates in cooperation with other blocks connected thereto by the arrows, to achieve its functions.

That is, to achieve the functions of a coordinated transmission management unit that manages coordinated transmission to which the present technology is applied, for example, the sequence management unit 107 operates in cooperation with each of the following components: the network management unit 103, the spatial multiplex transmission processing unit 108, the spatial multiplex reception processing unit 109, the management information generation unit 110, the management information processing unit 111, the transmission power control unit 113, the transmission/reception antenna control unit 114, and the detection threshold control unit 115.

Further, in FIG. 8, each of the components constituting the wireless communication module 15 can be divided into the three blocks of a transmission/reception data input/output unit 151, a control unit 152, and a radio signal transmission/reception unit 153, as indicated by a dashed-line frames. However, these components may be divided into some other number (four or larger, for example) of blocks.

Here, the transmission/reception data input/output unit 151 includes the interface 101, the transmission buffer 102, the network management unit 103, the transmission frame construction unit 104, the reception data construction unit 105, and the reception buffer 106, and mainly performs processing and control related to input transmission data and output reception data.

Meanwhile, the control unit 152 includes the sequence management unit 107, the spatial multiplex transmission processing unit 108, the spatial multiplex reception processing unit 109, the management information generation unit 110, and the management information processing unit 111, and mainly performs processing and control related to transmission or reception of frames. Note that the control unit 152 may also include other blocks.

Further, the radio signal transmission/reception unit 153 includes the wireless transmission processing unit 112, the transmission power control unit 113, the transmission/reception antenna control unit 114, the detection threshold control unit 115, and the wireless reception processing unit 116, and mainly performs processing and control related to signals such as a transmission signal and a reception signal.

In the wireless communication module 15 designed as above, the processes described below, for example, are performed by the control unit 152 including the sequence management unit 107, the spatial multiplex transmission processing unit 108, the spatial multiplex reception processing unit 109, the management information generation unit 110, and the management information processing unit 111 in particular.

Specifically, in the wireless communication module 15 of the transmission-side communication device 10Tx (the coordinator access point AP1, for example) at a time of coordinated transmission, the control unit 152 performs control to: transmit data (an A-MPDU frame, for example) to the reception-side communication device (the communication terminal STA, for example); generate a request signal (an ACK request trigger frame such as a MU-BAR trigger frame in FIG. 17) including coordinated transmission information (Coordinate BAR Info in FIG. 19, for example) related to the coordinated transmission, and acknowledgement return information (BAR User Info in FIG. 20, for example) for simultaneously returning an acknowledgement of coordinately transmitted data to a plurality of transmission-side communication devices (the plurality of access points AP1 and AP2, for example); transmit the generated request signal to the reception-side communication device (the communication terminal STA, for example); and receive an acknowledgement signal (a block ACK frame in FIG. 21 or FIG. 22, for example) that includes an acknowledgement and is transmitted from the reception-side communication device (the communication terminal STA, for example) that has received the request signal.

Meanwhile, in the wireless communication module 15 of the reception-side communication device 10Rx (the communication terminal STA, for example) at a time of coordinated transmission, the control unit 152 performs control to: receive data (an A-MPDU frame, for example) transmitted from a plurality of transmission-side communication devices (the plurality of access points AP1 and AP2, for example); generate an acknowledgement according to the correctly received data in the coordinately transmitted data; receive a request signal (an ACK request trigger frame such as the MU-BAR trigger frame in FIG. 17) including coordinated transmission information (Coordinate BAR Info in FIG. 19, for example) that is related to the coordinated transmission and is transmitted from the transmission-side communication device (the coordinator access point AP1, for example), and acknowledgement return information (BAR User Info in FIG. 20, for example) for simultaneously returning an acknowledgement of the coordinately transmitted data to the plurality of transmission-side communication devices (the plurality of access points AP1 and AP2, for example); and transmit an acknowledgement signal (the block ACK frame in FIG. 21 or 22, for example) including the generated acknowledgement, on the basis of the received request signal.

(Outline of OFDMA)

Figure 9A:
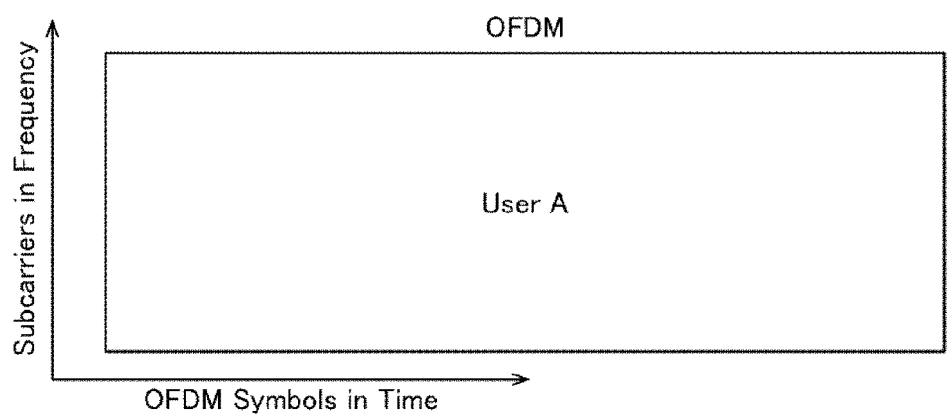
FIGS. 9A and 9B are diagrams illustrating an outline of OFDMA.
Figure 9B:
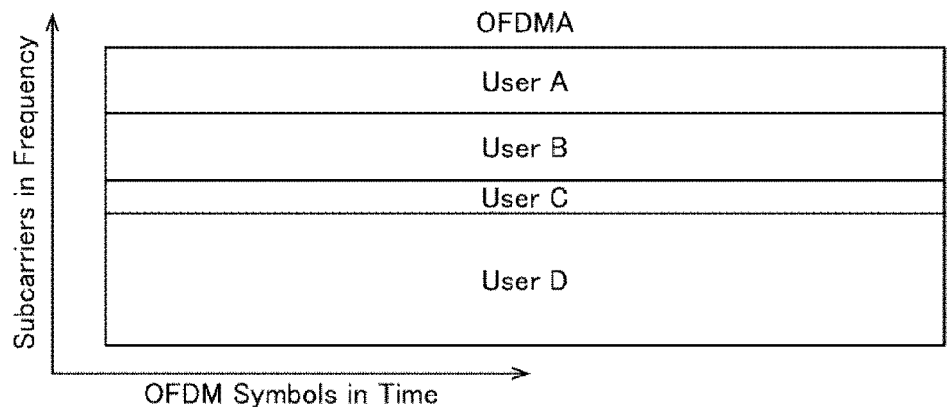

FIGS. 9A and 9B are diagrams showing an outline of orthogonal frequency division multiple access (OFDMA).

In FIGS. 9A and 9B, FIG. 9A in the upper half shows conventional orthogonal frequency division multiplexing (OFDM) for comparison, and FIG. 9B in the lower half shows orthogonal frequency division multiple access (OFDMA) that is used in the present technology.

Further, in FIGS. 9A and 9B, the ordinate axis is the subcarrier frequency axis (Subcarriers in Frequency), and the abscissa axis is the time axis (OFDM Symbols in Time).

OFDM is a kind of multicarrier modulation system in which data is divided into carrier waves called subcarriers and is transmitted in parallel in a frequency direction. In OFDM, the respective subcarriers are orthogonally set, so that intervals between the subcarriers can be densely placed for effective use of the frequency band, and the influence of multipath and interference can be reduced.

As shown in FIG. 9A, in OFDM, frequency resources are allocated only to one user (User A).

On the other hand, OFDMA is a method for realizing multiple access at the same frequency by allocating subcarriers of OFDM to different users, taking advantage of the features of OFDM.

As shown in FIG. 9B, in OFDMA, frequency resources are allocated to a plurality of users (the four users of User A to User D) in terms of the respective subcarriers. That is, this drawing shows that a feature of OFDMA is allocating frequency resources separately from one another, depending on needs of the users.

(Transmission/Reception Relationship)

FIGS. 10A, 10B, 10C and 10D are diagrams showing the transmission/reception relationship in each communication device.

FIGS. 10A, 10B, 10C, and 10D schematically show how transmission and reception of signals in the respective communication devices 10 are performed with the lapse of time, in a case where the communication terminal STAO is present in the configuration of the wireless network shown in FIG. 1, which is a configuration in which the master access point AP (Master AP), the coordinator access point AP1 (coordinator AP), and the access point AP2 are provided.

FIG. 10A, which is the first row in the drawing, shows transmission and reception of signals in the master access point AP. FIGS. 10B and 10C, which are the second and third rows in the drawing, show transmission and reception of signals in the coordinator access point AP1 and the access point AP2, respectively. Further, FIG. 10D, which is the fourth row in the drawing, shows transmission and reception of signals in the communication terminal STAO.

First, a coordinated transmission trigger frame from the master access point AP is transmitted ("Coordinate Trigger" in FIG. 10A), and the coordinator access point AP1 and the access point AP2 receive the coordinated transmission trigger frame ("Receive" in FIGS. 10B and 10C, which corresponds to "Coordinate Trigger" in FIG. 10A).

The coordinator access point AP1 and the access point AP2 then perform coordinated transmission of data frames at the same timing ("Coordinate Data (AP1-STA)" and "Coordinate Data (AP2-STA)" in FIGS. 10B and 10C).

Here, an uplink multiuser spatial multiplexing technology is used, for example, to transmit data having parameters set therein from a plurality of transmission-side communication devices 10Tx (AP1 and AP2) to one reception-side communication device 10Rx (STAG). Note that, in this example, data may be transmitted by adopting the technology of orthogonal frequency division multiple access (OFDMA), together with a configuration using the technology of spatial streams.

With this arrangement, the communication terminal STAO can simultaneously receive the data frames coordinately transmitted from the coordinator access point AP1 and the access point AP2 ("Receive" in FIG. 10D, which corresponds to "Coordinate Data (AP1-STA)" and "Coordinate Data (AP2-STA)" in FIGS. 10B and 10C).

Further, the coordinator access point AP1 transmits an ACK request trigger frame to the communication terminal STAO at a predetermined timing after coordinately transmitting the data frame ("MU-BAR Trigger" in FIG. 10B). As a result, the communication terminal STAO receives the ACK request trigger frame from the coordinator access point AP1 ("Receive" in FIG. 10D, which corresponds to "MU-BAR Trigger" in FIG. 10B).

Here, resource information or the like is written in this ACK request trigger frame, for example. Note that this ACK request trigger frame may be receivable by the other access point AP2 ("Receive" in FIG. 10C, which corresponds to "MU-BAR Trigger" in FIG. 10B).

In the communication terminal STAO that has received the ACK request trigger frame, a block ACK frame addressed to the coordinator access point AP1 and a block ACK frame addressed to the access point AP2 are generated, are multiplexed by different OFDMAs, and are simultaneously returned ("BA: RU1" and "BA: RU2" FIG. 10D).

However, this block ACK frame has a configuration in which the sequence number of the correctly received data (an MPDU from AP1 or AP2, for example) of at least one piece of data in the data (the MPDUs of an A-MPDU frame, for example) coordinately transmitted from the coordinator access point AP1 or the access point AP2 is written to indicate that the data has been successfully received.

Further, this block ACK frame has a configuration for designating parameters optimized for reception by the coordinator access point AP1, and information regarding this is written in the already received ACK request trigger frame. Thus, the communication terminal STAG can set transmission parameters, in accordance with the information written in the ACK request trigger frame.

The coordinator access point AP1 then receives the block ACK frame from the communication terminal STAO ("Receive" in FIG. 10B, which corresponds to "BA: RU1" in FIG. 10D), recognizes the data reception status in the communication terminal STAO, and identifies the data (an MPDU, for example) that needs to be retransmitted. Here, each access point AP (AP1, AP2) retransmits data (an MPDU, for example) as necessary.

Note that, if the block ACK frame from the communication terminal STAO can also be received by the other access point AP2 ("Receive" in FIG. 10C, which corresponds to "BA: RU2" in FIG. 10D), it is possible to recognize beforehand whether retransmission is necessary.

Further, when the communication terminal STAO has received all the data (MPDUs, for example), the coordinator access point AP1 transmits a completion notice frame for notifying others of completion, to the master access point AP and the access point AP2 ("Complete" in FIG. 10B).

As a result, the master access point AP and the access point AP2 receive the completion notice frame from the coordinator access point AP1 ("Receive" in FIGS. 10A and 10C, which correspond to "Complete" in FIG. 10B), and the series of coordinated transmission sequences come to an end.

(Example Configuration of an A-MPDU Frame)

Figures 11A, 11B, 11C:
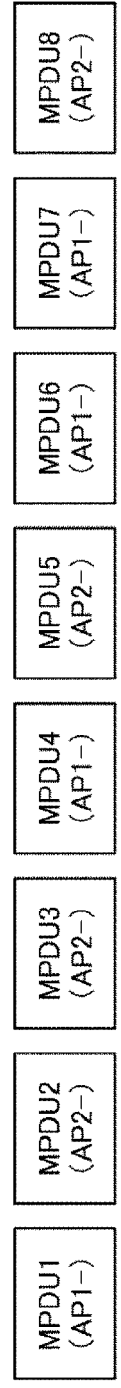
FIGS. 11A, 11B, and 11C are diagrams showing an example configuration of an A-MPDU frame to which the present technology is applied.

FIGS. 11A, 11B, and 11C are diagrams showing an example configuration of an A-MPDU frame to which the present technology is applied.

In the present technology, an aggregation-MPDU (A-MPDU) frame to which frame aggregation is applied can be used as a data frame to be transmitted from an access point AP. An A-MPDU frame is formed as one frame in which a plurality of data units (MAC protocol data units (MPDUs)) is aggregated. Note that, when an A-MPDU frame is a data frame, it can be said that each of the aggregated MPDUs is also a subframe.

Here, the configurations of the A-MPDU frames to be coordinately transmitted by the coordinator access point AP1 and the access point AP2 differ from each other.

Specifically, the order of the MPDUs in the respective A-MPDU frames is varied. Thus, even if an error occurs in some of the data (MPDUs) in both A-MPDU frames at the same timing, the communication terminal STAG can more reliably restore the data by combining the data (MPDUs) of the portions having no errors in both A-MPDU frames.

FIG. 11A shows an example configuration of an A-MPDU frame (Coordinate Data (AP1-STA)) to be transmitted from the coordinator access point AP1 to the communication terminal STA0. In FIG. 11A, the respective MPDUs of MPDU 1 to MPDU 8 are arranged in ascending order of the sequence numbers, from the head to the end of the A-MPDU frame.

FIG. 11B shows an example configuration of an A-MPDU frame (Coordinate Data (AP2-STA)) to be transmitted from the access point AP2 to the communication terminal STA0. In FIG. 11B, the respective MPDUs of MPDU 8 to MPDU 1 are arranged in descending order of the sequence numbers, from the head to the end of the A-MPDU frame.

In this example, the communication terminal STA0 simultaneously receives the A-MPDU frames (FIGS. 11A and 11B) coordinately transmitted from the coordinator access point AP1 and the access point AP2, and decodes the A-MPDU frames. FIG. 11C shows the data (MPDUs) obtained as a result of the decoding. However, in FIGS. 11A and 11B, the circles (o) and the cross marks (x) shown on the respective MPDUs indicate whether the decoding is correct.

That is, this drawing shows an example case where each coordinately transmitted A-MPDU frame is formed with eight MPDUs, the first, fourth, sixth, and seventh MPDUs have been successfully decoded, and the second, third, fifth, and eighth MPDUs have not, for example (FIGS. 11A and 11B).

Even in such a case, the communication terminal STA0 can decode the first MPDU 1, the fourth MPDU 4, the sixth MPDU 6, and the seventh MPDU 7 in the A-MPDU frame (FIG. 11A) from the coordinator access point AP1, and the first MPDU 8, the fourth MPDU 5, the sixth MPDU 3, and the seventh MPDU 2 in the A-MPDU frame (FIG. 11B) from the access point AP2. Accordingly, the communication terminal STA0 can correctly decode MPDU 1 to MPDU 8, which are all the MPDUs.

As described above, even if an error occurs in some of the data (MPDUs) of coordinately transmitted A-MPDU frames, the communication terminal STAG can correctly receive all of MPDU1 to MPDU8 by collecting correctly decoded (received) data (MPDUs) of one of the A-MPDU frames. Thus, the data can be restored more reliably.

Next, examples of frame formats that are used in the present technology are described, with reference to FIGS. 12 to 24.

(Example Configuration of a Coordinated Transmission Trigger Frame)

FIG. 12 is a diagram showing an example configuration of a coordinated transmission trigger frame (Coordinate Trigger Frame) compatible with the novel system.

In this coordinated transmission trigger frame, Frame Control indicating the type, the format, and the like of the frame, Duration indicating the duration of the frame, Receive Address designating a broadcast address as the address of the receiving end, and Transmit Address designating the address of the coordinator access point AP (AP1) as the address of a transmission-side communication device 10Tx are written as header information.

The coordinated transmission trigger frame also includes a Coordinate Common Info subfield that is common information, a Coordinate TX Info subfield in which parameters of coordinated transmission are written, and a Coordinate User Info subfield in which parameters of each user are written. Further, a padding is added to the coordinated transmission trigger frame as necessary, and a frame check sequence (FCS) for detecting an error in the frame is added to the coordinated transmission trigger frame.

FIG. 13 is a diagram showing an example configuration of the Coordinate Common Info subfield of the coordinated transmission trigger frame shown in FIG. 12.

This Coordinate Common Info subfield has a layout according to the configuration of the Common Info subfield of a trigger frame (Trigger Frame) compatible with a conventional system, and a bit for identifying the information for performing coordinated transmission is set in Coordinate Identifier.

FIG. 14 is a diagram showing an example configuration of the Coordinate TX Info subfield of the coordinated transmission trigger frame shown in FIG. 12.

In this Coordinate TX Info subfield, common parameters are stored in a case where coordinated transmission is performed. For example, start sequence number information for managing transmission data with the same sequence numbers at the time of coordinated transmission is written.

Specifically, in the Coordinate TX Info subfield, the following information is written: Coordinate Block ACK Identifier for identifying a block ACK frame for coordinated transmission, Total Length indicating the information length of the Coordinate TX Info, STA AID for identifying the communication terminal STA that receives coordinated transmission, Coordinate Transmit Starting Sequence No indicating the start sequence number for coordinated transmission, Block ACK Bitmap Subfield Length indicating the block ACK bitmap subfield length, A-MPDU Order indicating the order of the sequence numbers of A-MPDUs, Coordinate AP Counts indicating the number of access points AP that perform coordinated transmission, and the like.

FIG. 15 is a diagram showing an example configuration of the Coordinate User Info subfield of the coordinated transmission trigger frame shown in FIG. 12.

This Coordinate User Info subfield is placed according to the configuration of the User Info subfield of a trigger frame (Trigger Frame) compatible with a conventional system, and a Coordinate Transmit User Information field is set as information for performing coordinated transmission.

In this Coordinate Transmit User Information field, only the parameters necessary for individual data transmission in the Coordinate TX Info subfield described above are extracted and written. Here, for example, parameters such as STA AID, Coordinate Transmit Start Sequence No, Block ACK Bitmap Subfield Length, A-MPDU Order, and Coordinate AP Counts can be written.

(Example Configuration of an A-MPDU Frame)

Figure 16:
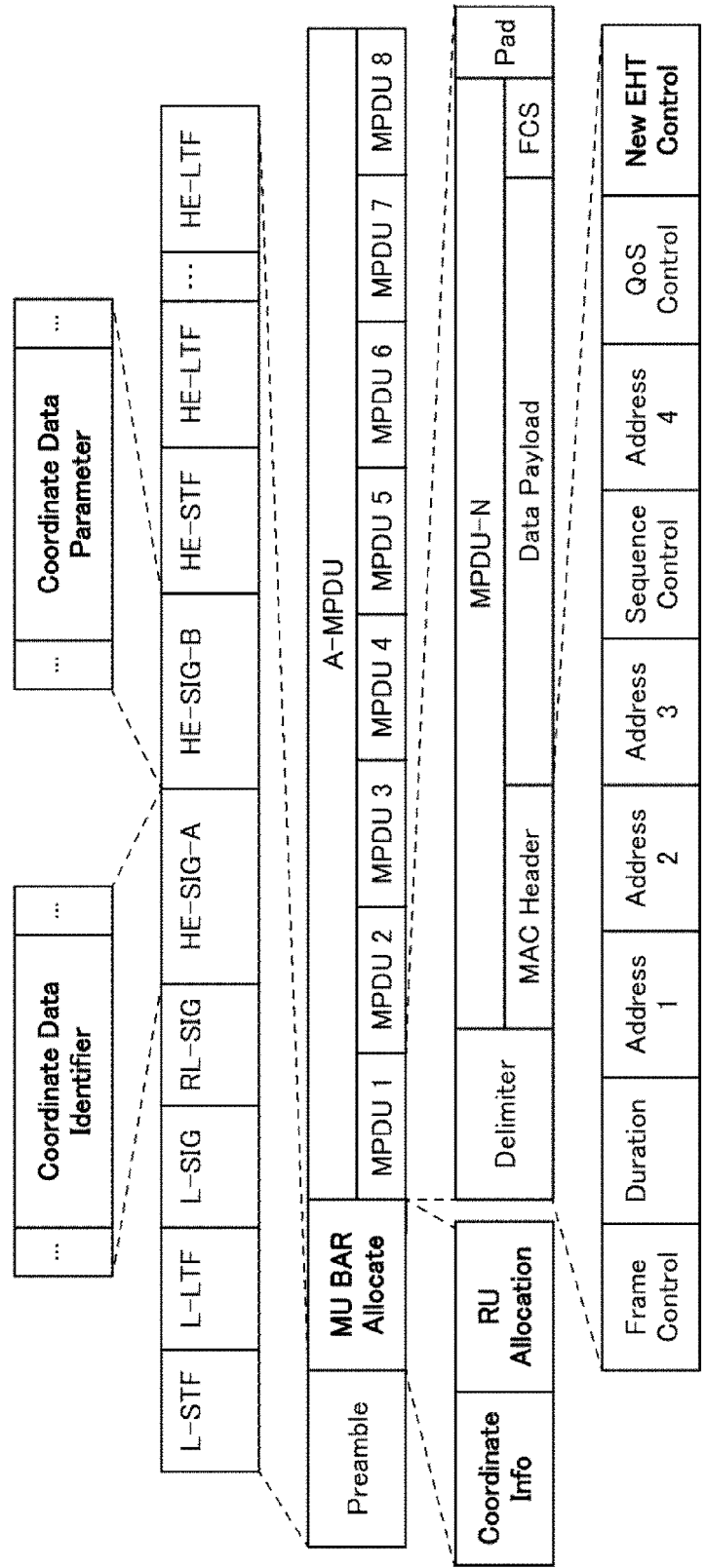
FIG. 16 is a diagram showing an example configuration of an A-MPDU frame.

FIG. 16 is a diagram showing an example configuration of an A-MPDU frame compatible with the novel system.

An A-MPDU frame to which the present technology is applied has portions corresponding to those in the configuration of an A-MPDU frame in a wireless LAN system compatible with a conventional system, but differs from the conventional A-MPDU frame in including parameters indicating that coordinated transmission that is a feature of the present technology is performed.

In FIG. 16, the A-MPDU frame includes a physical layer preamble signal (Preamble) and an A-MPDU. Further, an A-MPDU includes MPDUs corresponding to the number of the subframes to be aggregated, but the A-MPDU in this example includes the eight MPDUs of MPDU 1 to MPDU 8.

The preamble signal includes a predetermined number of HE-LTFs repeated in accordance with the number of spatial multiplexes, in addition to L-STF, L-LTF, L-SIG, RL-SIG, HE-SIG-A, HE-SIG-B, and HE-STF.

Specifically, L-STF indicates a conventional short training field, and L-LTF indicates a conventional long training field. Further, L-SIG indicates conventional signaling information, RL-SIG indicates repetitive signaling information, and HE-SIG-A indicates high-density signaling information. Furthermore, HE-STF indicates a high-density short training field, and HE-LTF indicates a high-density long training field.

Here, in the A-MPDU frame compatible with the novel system, Coordinate Data Identifier for identifying coordinated transmission is written in HE-SIG-A of the preamble signal, and Coordinate Data Parameter that is a specific parameter in a case where the coordinated transmission is performed is written in HE-SIG-B.

Further, in a case where a configuration in which the parameters of a multiuser block ACK request (MU-BAR) are written in a data frame to be transmitted is adopted, information (MU BAR Allocate) regarding the resource allocation for MU-BAR may be added to the header portion of the A-MPDU frame. This MU BAR Allocation may be formed with Coordinate Info in which the parameters of coordinated transmission are written, RU Allocation in which resource information regarding the resource allocation for the block ACK frames to be returned later through OFDMA is written, and the like.

That is, as shown in FIG. 5 described above, in a case where a configuration in which an ACK frame return trigger of coordinated transmission is aggregated in data is adopted, coordinated transmission information related to the coordinated transmission is written in Coordinate Info, and acknowledgement return information including the resource information is written in RU Allocation in MU BAR Allocation. Here, the coordinated transmission information includes common information that is shared among a plurality of transmission-side communication devices 10Tx when an acknowledgement is requested. Meanwhile, the acknowledgement return information includes unique information unique to each of the transmission-side communication devices 10Tx when an acknowledgement is requested.

Each of the MPDUs constituting the A-MPDU includes a delimiter (Delimiter) indicating a subframe boundary, and a MAC protocol data unit (MPDU). If necessary, a padding (Pad) is added thereto. Further, in each MPDU, a predetermined MAC header (MAC Header) and a data payload (Data Payload) are provided, and FCS is added.

In the MAC header, Frame Control indicating the format of the frame, Duration indicating the duration of the frame, Address 1 to Address 4 indicating address information for identifying the communication devices 10, Sequence Control indicating the sequence number, and QoS Control indicating QoS parameters are written. Also, in the MAC header, parameters (New EHT Control) compatible with the novel system may be written.

Specifically, as shown in FIG. 6 described above, in a case where a configuration in which an ACK frame return trigger (parameters) is included in the header information of the data frame is adopted, the parameters (New EHT Control) compatible with the novel system include the coordinated transmission information regarding coordinated transmission, and the acknowledgement return information including the resource information.

(Example Configuration of an ACK Request Trigger Frame)

FIG. 17 is a diagram showing an example configuration of an ACK request trigger frame compatible with the novel system. In the description below, a MU-BAR trigger frame (Coordinate MU-BAR Trigger Frame) that is used in coordinated transmission is described as an example of an ACK request trigger frame.

In this MU-BAR trigger frame, Frame Control indicating the type, the format, and the like of the frame, Duration indicating the duration of the frame, Receive Address designating a broadcast address as the address of the receiving end, and Transmit Address designating the address of the coordinator access point AP (AP1) as the address of a transmission-side communication device 10Tx are written as header information.

The MU-BAR trigger frame also includes a BAR Common Info subfield that is common information, a Coordinate BAR Info subfield in which parameters of coordinated transmission are written, and a BAR User Info subfield in which parameters of each user are written. A padding is further added as necessary, and FCS for error detection in the frame is added.

Specifically, as shown in FIG. 4 described above, in a case where a configuration in which an ACK frame return trigger of coordinated transmission is an independent trigger frame is adopted, the coordinated transmission information regarding the coordinated transmission is written in the Coordinate BAR Info subfield, and the acknowledgement return information including the resource information is written in the BAR User Info subfield in the MU-BAR trigger frame.

FIG. 18 shows an example configuration of the BAR Common Info subfield of the ACK request trigger frame (MU-BAR trigger frame) shown in FIG. 17.

This BAR Common Info subfield has a layout according to the configuration of the Common Info subfield of a trigger frame (Trigger Frame) compatible with a conventional system, and a bit for identifying the information for performing coordinated transmission is set in Coordinate Identifier.

FIG. 19 shows an example configuration of the Coordinate BAR Info subfield of the ACK request trigger frame (MU-BAR trigger frame) shown in FIG. 17.

In this Coordinate BAR Info subfield, parameters that are shared when a block ACK frame is requested after coordinated transmission are stored. For example, information about the start sequence number of data at a time of coordinated transmission, an identifier for issuing an instruction to combine and write receipt acknowledgments regarding a plurality of pieces of coordinately transmitted data, and the like are written in this Coordinate BAR Info subfield.

Specifically, in the Coordinate BAR Info subfield, the following information is written: Coordinate Block ACK Identifier for identifying a block ACK frame for coordinated transmission, Total Length indicating the information length of the Coordinate BAR Info, Block ACK Starting Sequence Number indicating the start sequence number for coordinated transmission, Block ACK Bitmap Subfield Length indicating the block ACK bitmap subfield length, Combine BA Identifier as an identifier for issuing an instruction to combine and write receipt acknowledgments regarding a plurality of pieces of coordinately transmitted data, Combine AP Counts indicating the number of access points AP that perform coordinated transmission, and Target AP AID for identifying the access points AP that perform coordinated transmission, for example.

Figure 20:
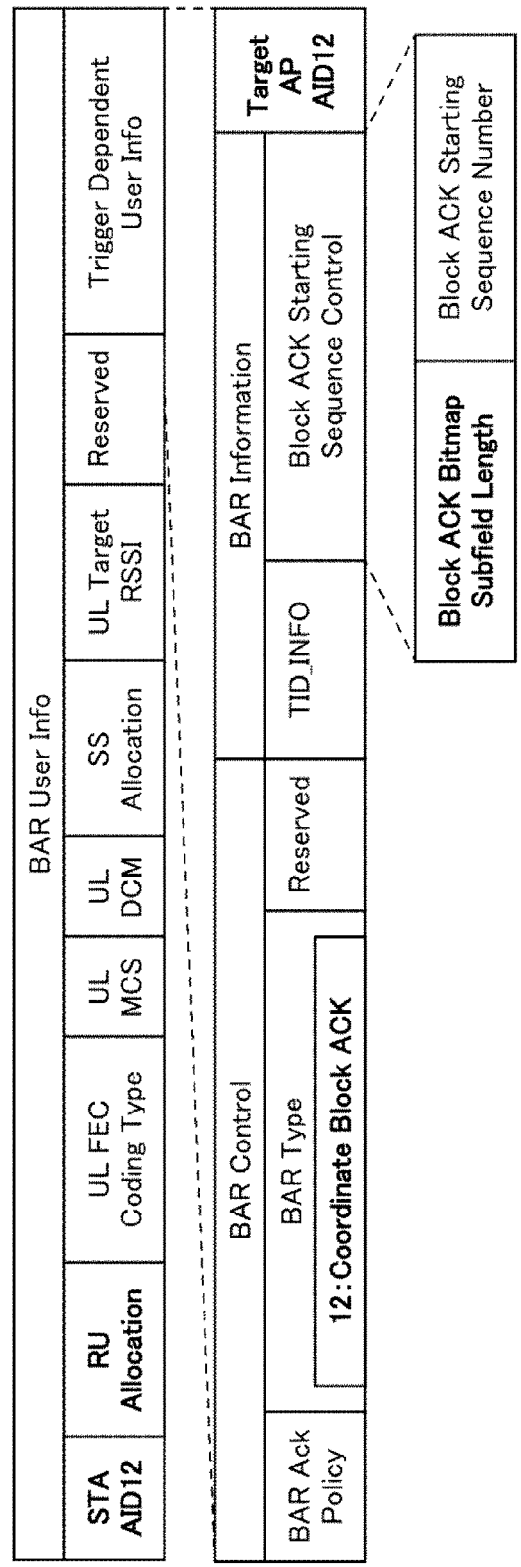
FIG. 20 is a diagram showing an example configuration of a BAR User Info subfield of an ACK request trigger frame.

FIG. 20 shows an example configuration of the BAR User Info subfield of the ACK request trigger frame (MU-BAR trigger frame) shown in FIG. 17.

This BAR User Info subfield is placed according to the configuration of the User Info subfield of a trigger frame (Trigger Frame) compatible with a conventional system, but differs from the conventional configuration particularly in the aspects described below.

Specifically, the BAR User Info subfield includes STA AID12 for identifying the communication terminal STA, RU Allocation in which the resource information regarding the resource allocation for the block ACK frames to be returned later through OFDMA, and the like, for example. Note that, as will be described later in detail, the OFDMA technology is an example of a simultaneous multiplex access technology, and some other technology such as a spatial multiplex stream (Spatial Stream) technology may be used, for example.

Furthermore, in the BAR Type field conventionally defined in Trigger Dependent User Info, Variant for identifying a return of a block ACK frame compatible with the novel system (Coordinate Block ACK) is prepared. For example, in the case of a numerical value of 12, it can be identified that the block ACK frame has a Coordinate Block ACK frame configuration.

This frame is placed according to the configuration of a block ACK frame compatible with a conventional system. However, to identify Coordinate Block ACK, Variant for identifying Coordinate Block ACK is prepared in the conventional BA Type field. For example, in the case of a numerical value of 12, it can be identified that the block ACK frame has a Coordinate Block ACK frame configuration.

Also, to make the lengths of block ACK frames uniform, Block ACK Bitmap Subfield Length indicating the information length of Block ACK Bitmap, and Block ACK Starting Sequence Number may be prepared in Block ACK Starting Sequence Control.

Further, a Target AP AID12 field is set as information for requesting a block ACK frame as a result of coordinated transmission. That is, this MU-BAR trigger frame is designed to request the communication terminal STA to transmit a block ACK frame to the coordinator access point AP (AP1), but, in this example, indicates a request for a coordinately transmitted block ACK frame to another access point AP (AP2).

(Example Configuration of a Block ACK Frame)

Figure 21:
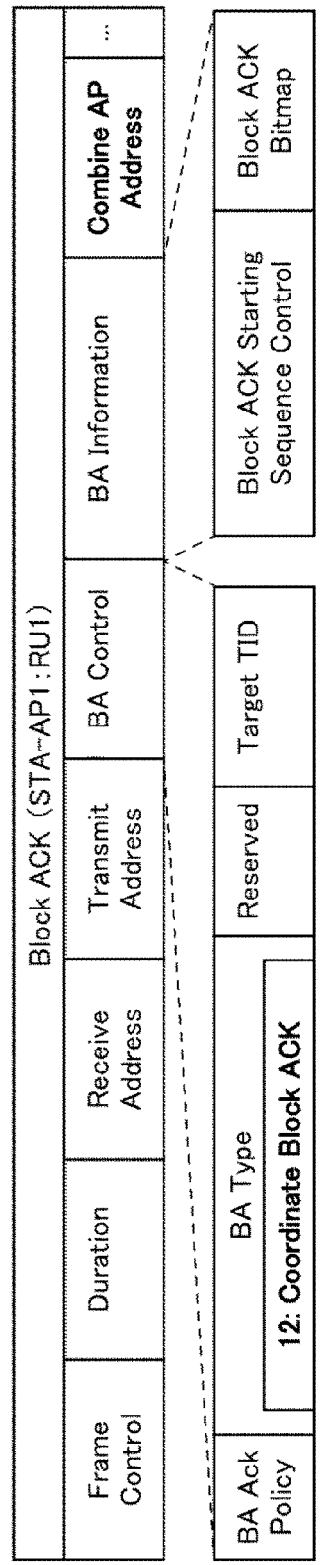
FIG. 21 is a diagram showing a first example configuration of a block ACK frame.

FIG. 21 is a diagram showing a first example configuration of a block ACK frame (Coordinate Block ACK Frame) compatible with the novel system.

A block ACK frame a communication terminal STA returns in response to a MU-BAR trigger frame compatible with the novel system can be a block ACK frame compatible with a conventional system. In this example, however, a block ACK frame compatible with the novel system is defined to clarify the features of the present technology.

The block ACK frame compatible with the novel system is placed according to the configuration of a block ACK frame compatible with a conventional system. However, to identify the block ACK frame compatible with the novel system (Coordinate Block ACK), Variant for identifying Coordinate Block ACK is prepared in a conventional BA Type field. For example, in the case of a numerical value of 12, it can be identified that the block ACK frame has a Coordinate Block ACK frame configuration.

Further, in a case where the block ACK frame is to be returned to the coordinator access point AP (AP1), the address configuration shown in FIG. 21 is adopted. To indicate that ACK information regarding the coordinately transmitted data (MPDUs) is combined, a Combine AP Address field for identifying each access point AP from which the data (MPDUs) has been received may be added as necessary.

Note that, although the addresses of the access points AP from which data has been successfully received are written in this example, the designation may be performed in a simple format as the AIDs of the access points AP.

Figure 22:
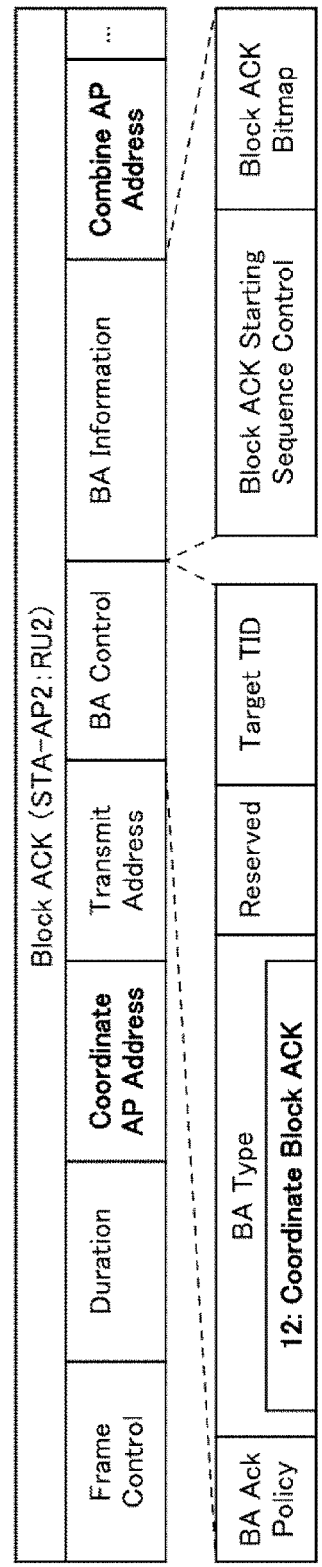
FIG. 22 is a diagram showing a second example configuration of a block ACK frame.

FIG. 22 is a diagram showing a second example configuration of a block ACK frame (Coordinate Block ACK Frame) compatible with the novel system.

In this example, a communication terminal STA returns a block ACK frame to an access point AP (AP2) operating as a dependent. However, for convenience, the block ACK frame is defined as a block ACK frame (Coordinate Block ACK Frame) compatible with the novel system in a case where the block ACK frame is returned to the coordinator access point AP (AP1) that has transmitted a MU-BAR trigger frame compatible with the novel system.

The block ACK frame in FIG. 22 has a configuration similar to that of the block ACK frame shown in FIG. 21 described above, but the address of the coordinator access point AP (AP1) is designated as Coordinate AP Address in a Receive Address field. That is, the block ACK frame compatible with the novel system is characteristically defined as a block ACK frame to be returned to another access point AP different from the access point AP directly under the control of the communication terminal STA.

Note that FIG. 23 shows an example of the values in the BAR Type field shown in FIG. 20. In FIG. 23, a numerical value of 12 for identifying Coordinate Block ACK is added as a value in the BAR Type field, for example, to support the novel system.

Further, FIG. 24 shows an example of the values in the BA Type field shown in FIG. 21 or 22. In FIG. 24, a numerical value of 12 for identifying Coordinate Block ACK is also added as a value in the BA Type field, for example, to support the novel system.

Next, processes to be performed by a communication device 10 operating as an access point AP or a communication terminal STA in a wireless LAN system compatible with the novel system are described with reference to flowcharts in FIGS. 25 to 29.

(Flow in AP Operation Setting)

Figure 25:
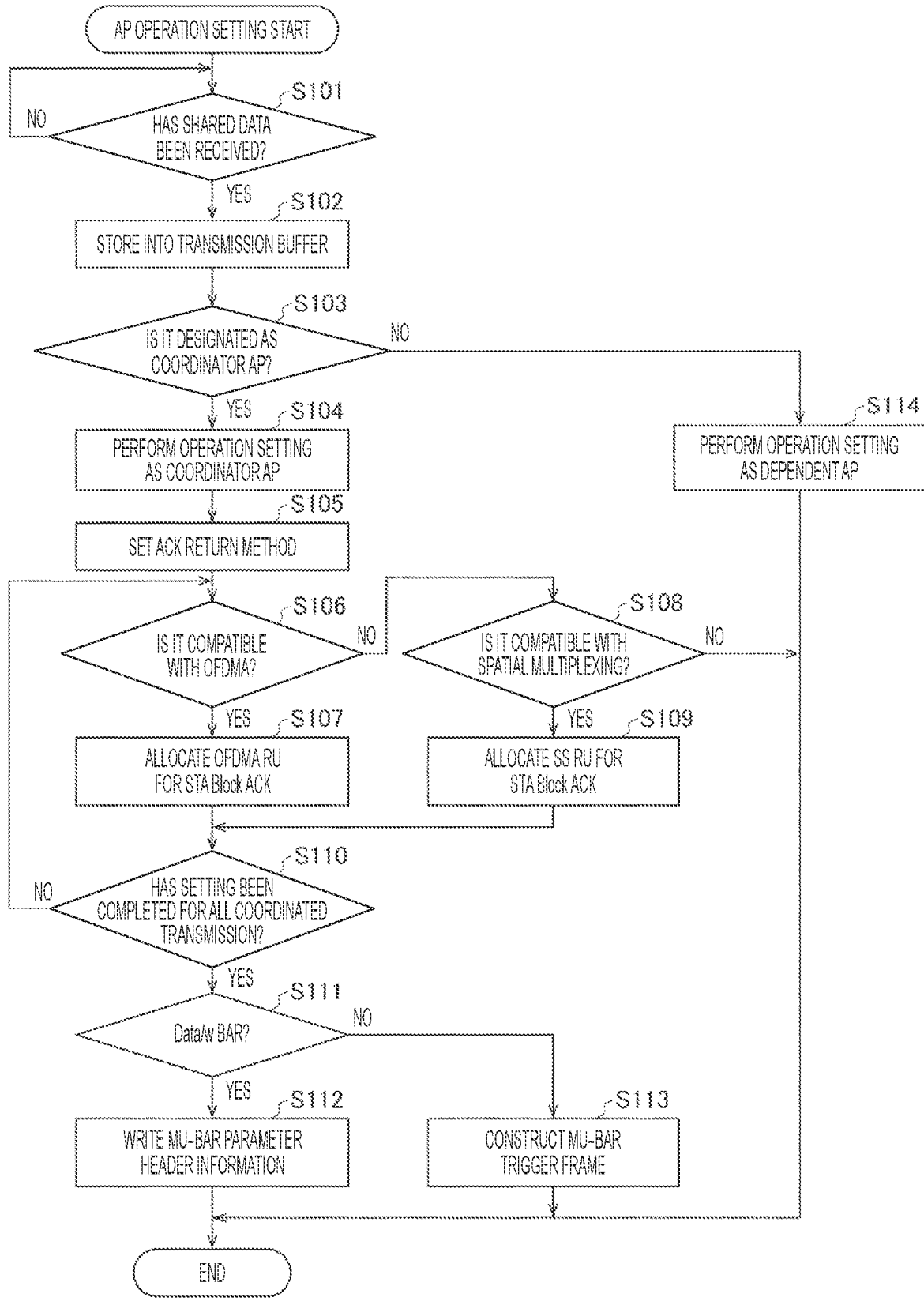
FIG. 25 is a flowchart showing a first example operation of a communication device.

Referring first to the flowchart in FIG. 25, a flow in AP operation setting compatible with the novel system is described. The AP operation setting is performed by (the wireless communication module 15 of) a transmission-side communication device 10Tx operating as an access point AP.

If the wireless communication module 15 receives data (shared data) to be coordinately transmitted with the other access point AP from the master access point AP, for example, before performing coordinated transmission ("YES" in S101), the wireless communication module 15 stores the shared data into the transmission buffer 102 (S102).

Further, if the access point AP is designated as the coordinator access point AP ("YES" in S103), the wireless communication module 15 performs operation setting in operations of its own device as the coordinator access point AP (S104), and sets a method for returning an ACK frame in later coordinated transmission (S105).

With this arrangement, a method for transmitting MU-BAR (Multiuser Block ACK Request) in coordinated transmission according to the novel system is set by the coordinator access point AP.

Here, if OFDMA multiplexing is selected as the method for returning an ACK frame ("YES" in S106), for example, an OFDMA resource unit (OFDMA RU) is allocated for a return of a block ACK frame by the communication terminal STA (S107).

On the other hand, if spatial multiplexing is selected as the method for returning an ACK frame ("NO" in S106, "YES" in S108), for example, a spatial multiplex resource unit (SS RU) is allocated for a return of a block ACK frame by the communication terminal STA (S109).

After a resource unit (RU information) is allocated as resource allocation information in step S107 or S109, a check is made to determine whether the setting of a method for returning an ACK frame has been completed for all the shared data to be coordinately transmitted (S110).

In this determination process (S110), if it is determined that the setting for all the coordinated transmission has not been completed yet ("NO" in S110), the process returns to step S106, the processes in steps S106 to S110 are repeated, and a method for returning an ACK frame is set for the remaining shared data.

If it is determined that the setting for all the coordinated transmission has been completed ("YES" in S110), on the other hand, a check is made to determine whether it is necessary to write parameters (Data/w BAR) of an ACK frame return in the A-MPDU frame (S111).

In this determination process (S111), if it is determined that there is the need to write the parameters (Data/w BAR) of an ACK frame return ("YES" in S111), the set parameters of MU-BAR are written as the header information of the A-MPDU frame (S112).

If it is determined that there is no need to write the parameters (Data/w BAR) of an ACK frame return, or if it is determined to transmit an ACK request trigger frame for resource allocation ("NO" in S111), on the other hand, a MU-BAR trigger frame including the set parameters of MU-BAR is constructed (S113).

When step S112 or S113 ends, the setting process comes to an end.

Note that, if it is determined in the determination process in step S103 that the access point AP is not designated as the coordinator access point AP ("NO" in S103), its own operations are set as those of an access point AP that operates in a dependent manner (S114), and the process comes to an end, without going through the series of processes for setting a method for returning an ACK frame. In this case, the transmission-side communication device 10Tx operating as an access point AP operates according to a MU-BAR system designated by another transmission-side communication device 10Tx operating as the coordinator access point AP.

A flow in AP operation setting is as described above.

(Flow in an AP Coordinated Transmission Operation)

Figure 26:
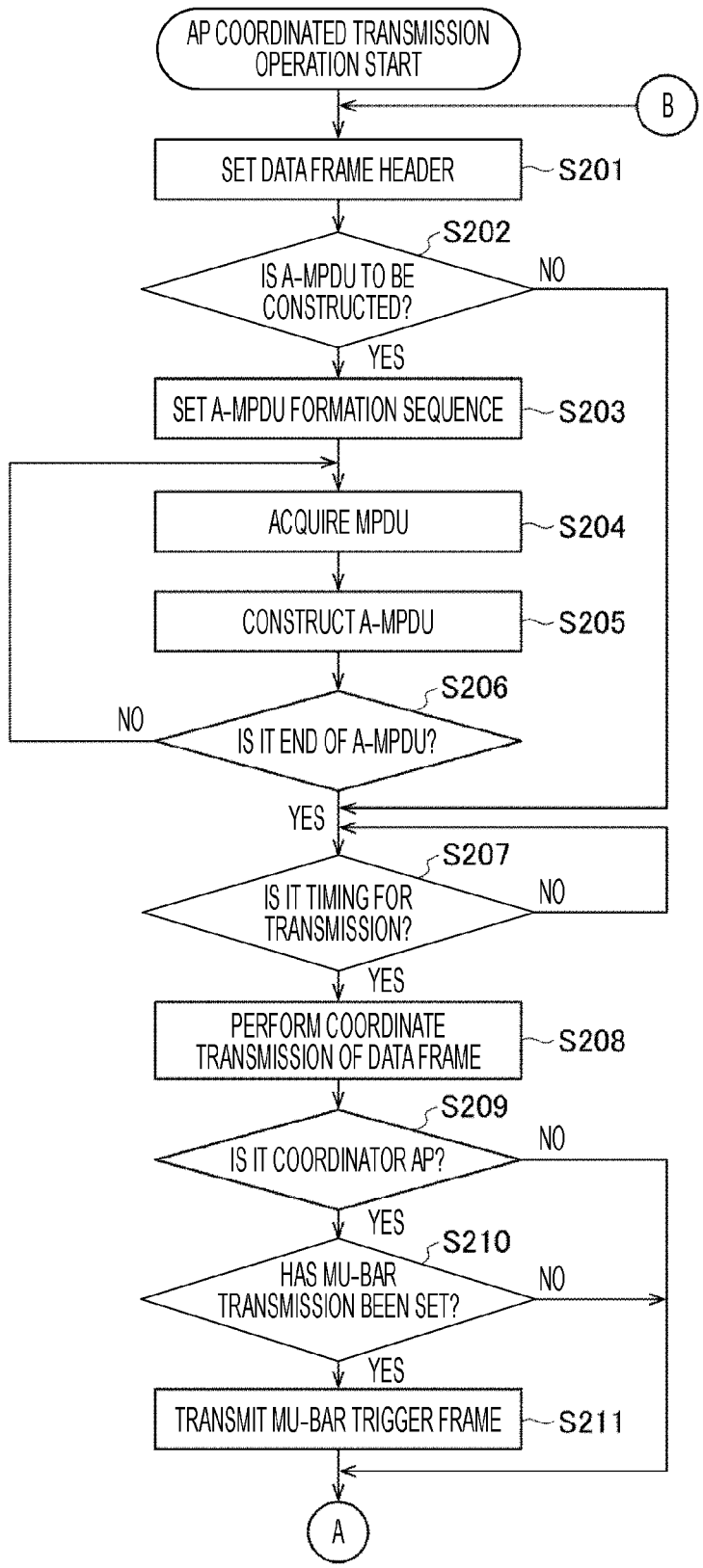
FIG. 26 is a flowchart showing a second example operation of a communication device.
Figure 27:
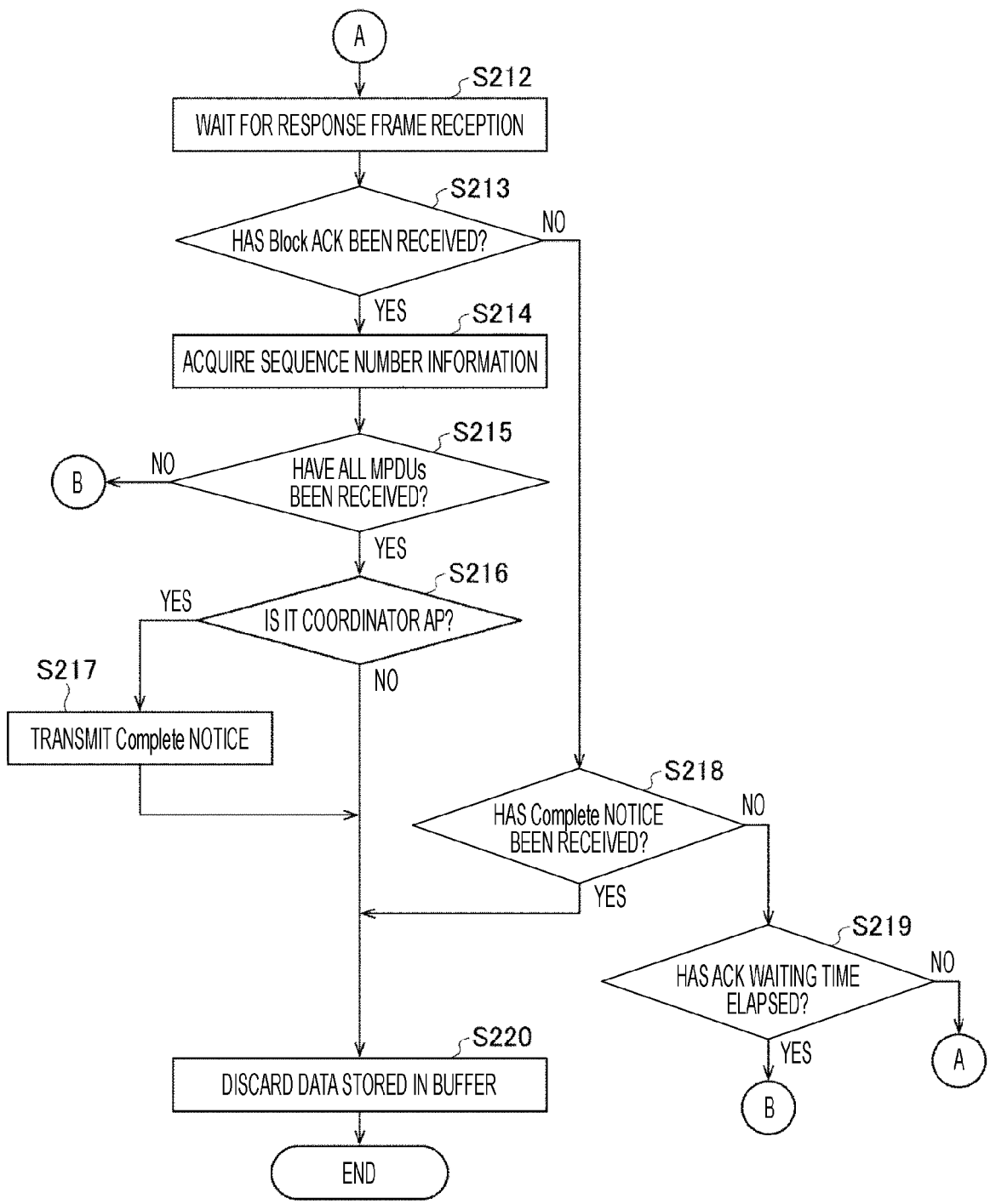
FIG. 27 is a flowchart showing the second example operation of the communication device.

Next, a flow in an AP coordinated transmission operation compatible with the novel system is described, with reference to the flowcharts in FIGS. 26 and 27. This AP coordinated transmission operation is performed by (the wireless communication module 15 of) a transmission-side communication device 10Tx operating as an access point AP. Note that this AP coordinated transmission operation is performed after the AP operation setting described above.

The wireless communication module 15 sets the header information of a data frame including the shared data to be coordinately transmitted (S201). If an A-MPDU frame is to be constructed as the data frame ("YES" in S202), the processes in steps S203 to S206 are performed.

Specifically, in an A-MPDU frame construction process, the formation sequence of an A-MPDU frame is set (S203), and MPDUs are acquired in that order (S204), so that an A-MPDU frame is constructed (S205). If the end of the A-MPDU frame has not arrived at this stage ("NO" in S206), the processes of MPDU acquisition (S204) and A-MPDU frame construction (S205) are repeated.

If the end of the A-MPDU frame arrives ("YES" in S206), the process then moves on to step S207. Note that, if it is determined in the determination process in step S202 that any A-MPDU frame is not to be constructed, a single MPDU frame is constructed as a data frame, and therefore, the processes in steps S203 to S206 are skipped.

When the data frame is constructed, the wireless communication module 15 stands by until the time for transmission comes (S207). If it is determined that the time for transmission has come after transmission of a coordinated transmission trigger frame from the master access point AP, for example, ("YES" in S207), a data frame such as the A-MPDU frame or the single MPDU frame is then coordinately transmitted (S208).

If its own transmission-side communication device 10Tx is the coordinator access point AP ("YES" in S209) after the data frame is transmitted, the wireless communication module 15 performs the processes in steps S210 and S211.

Specifically, in the process (S113 or the like in FIG. 25, for example) of setting a method for returning an ACK frame in FIG. 25 described above, for example, if the setting for transmitting a MU-BAR trigger frame has been performed ("YES" in S210), a MU-BAR trigger frame is transmitted (S211).

After that, the wireless communication module 15 performs an operation of waiting for reception of a response frame (S212). If the wireless communication module 15 receives a block ACK frame from the communication terminal STA ("YES" in S213), the processes in steps S214 and S215 are performed.

Specifically, received sequence number information is acquired from the received block ACK frame (S214). For example, in a case where an A-MPDU frame has been coordinately transmitted, a check is made to determine whether all the MPDUs have been received (S215).

If it is determined in this determination process (S215) that all the MPDUs have been received ("YES" in S215), and its own transmission-side communication device 10Tx is the coordinator access point AP ("YES" in S216), a completion notice (Complete notice) indicating completion of the coordinated transmission is transmitted (S217), and the shared data stored in the transmission buffer 102 is discarded (S220).

Note that, if its own transmission-side communication device 10Tx is an access point AP that operates in a dependent manner ("NO" in S216), the process in step S217 is skipped, and the shared data stored in the transmission buffer 102 is discarded (S220). Further, if it is determined that there is an undelivered MPDU ("NO" in S215), the process returns to step S201 in FIG. 26, and the data corresponding to the undelivered MPDU is retransmitted.

If it is determined that any block ACK frame from the communication terminal STA has not been received ("NO" in S213), on the other hand, the process moves on to step S218. Further, if a completion notice (Complete notice) from the coordinator access point AP has been received ("YES" in S218), the shared data stored in the transmission buffer 102 is discarded (S220).

Alternatively, even if any completion notice has not been received ("NO" in S218), when it is still within the block ACK frame waiting time ("NO" in S219), the process returns to step S212, and the operation of waiting for reception of a response frame is performed. If the block ACK frame waiting time has elapsed ("YES" in S219), on the other hand, the process returns to step S201 in FIG. 26, and retransmission of the undelivered data is performed.

Note that, when the process in step S220 is completed, the series of transmission operations come to an end. Further, in a case where a transmission-side communication device 10Tx operating as an access point AP performs coordinated transmission to each reception-side communication device 10Rx in a plurality of reception-side communication devices 10Rx (communication terminals STA), a resource for returning a block ACK frame including an acknowledgement of a coordinately transmitted data frame is set for each reception-side communication device 10Rx in the plurality of reception-side communication devices 10Rx (communication terminals STA).

A flow in an AP coordinated transmission operation is as described above.

(Flow in a STA Operation)

Figure 28:
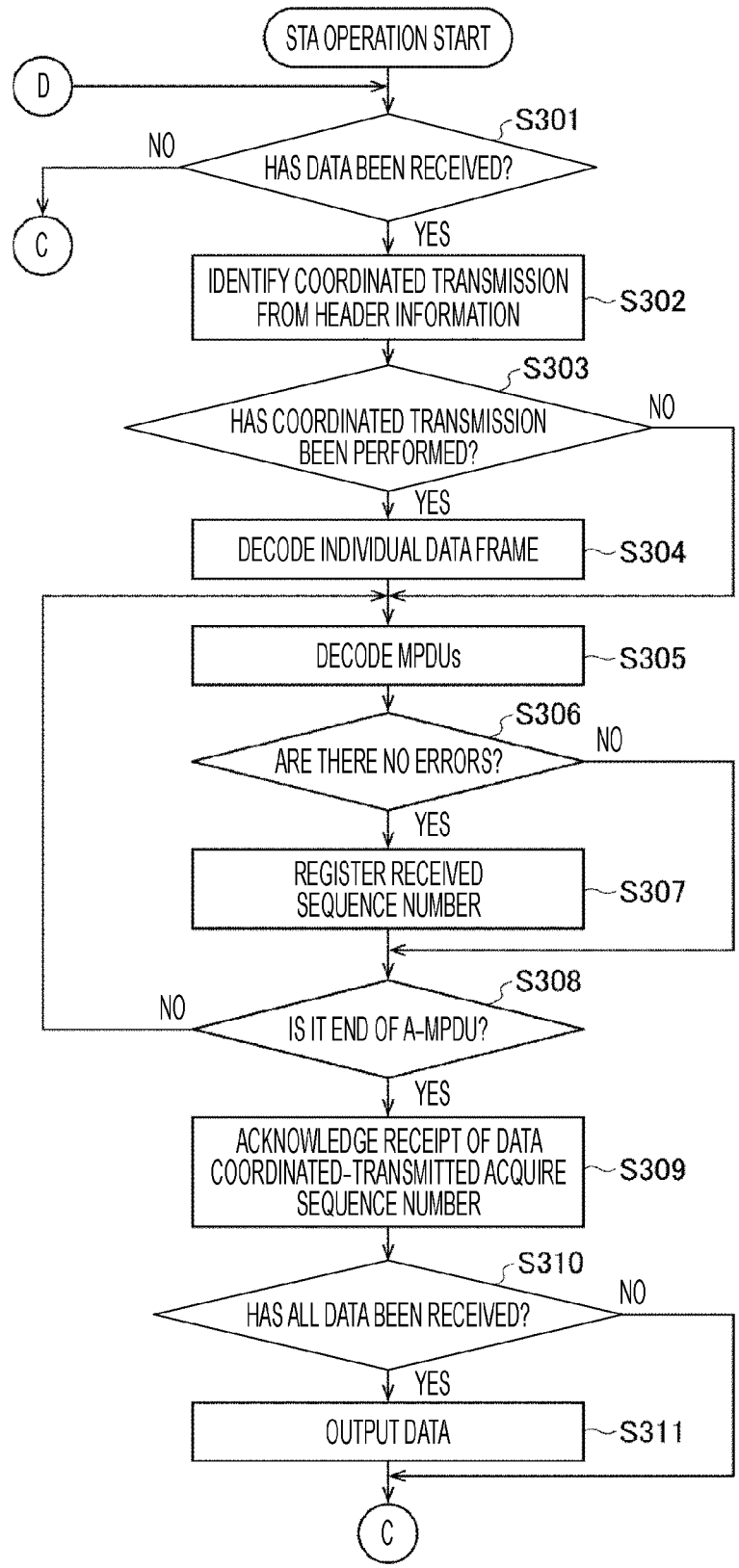
FIG. 28 is a flowchart showing a third example operation of a communication device.
Figure 29:
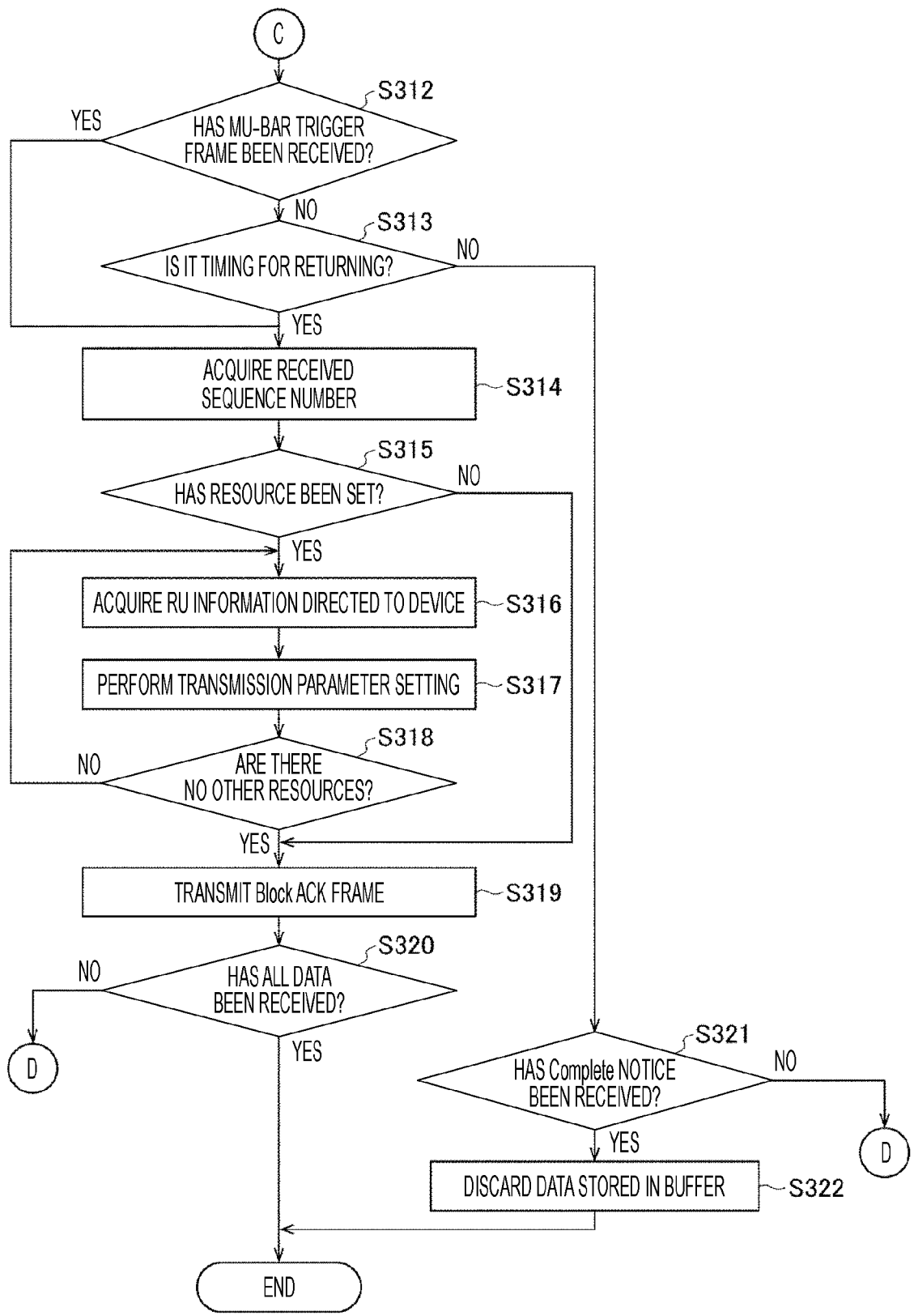
FIG. 29 is a flowchart showing the third example operation of a communication device.

Next, a flow in an operation by a communication terminal STA compatible with the novel system is described, with reference to the flowcharts in FIGS. 28 and 29. This operation is performed by (the wireless communication module 15 of) a reception-side communication device 10Rx operating as a communication terminal STA.

If data (data frame) addressed to its own reception-side communication device 10Rx has been received ("YES" in S301), the wireless communication module 15 determines whether the data is coordinately transmitted data, in accordance with the header information in the data frame (S302). If the data is coordinately transmitted data ("YES" in S303), the data frame individually multiplexed and transmitted is decoded (S304), and the processes in steps S305 to S308 are then performed. Note that the received data is stored into the reception buffer 106.

Specifically, the data (MPDU) included in the data frame such as an A-MPDU frame, for example, is decoded (S305). If the data has been successfully decoded without any error ("YES" in S306), the received sequence number corresponding to the data (MPDU) is registered (S307).

In a case where the data frame is formed as an A-MPDU frame, if the end of the A-MPDU frame has not arrived yet at this stage ("NO" in S308), the process returns to step S305, and the process of decoding the next MPDU (S305) and the process of registering the received sequence number (S307) are repeated. Note that, at this point of time, the above decoding process is performed on each A-MPDU frame that has been coordinately transmitted.

If the end of the A-MPDU frame has arrived ("YES" in S308) and all the coordinately transmitted data is collected, the coordinately transmitted data that has been received is then checked, all the MPDUs that have been successfully received are combined, and the sequence numbers that have been received are acquired (S309). At this stage, if all the data (MPDUs) has been received ("YES" in S310), the data is output via the interface 101 (S311).

Further, after receiving the data, the wireless communication module 15 receives a MU-BAR trigger frame ("YES" in S312), or acquires the registered received sequence numbers (S314) when the time for a return of a block ACK frame comes ("YES" in S313) in a case where the return of a block ACK frame has been decided beforehand.

Note that, if it is determined in the determination process step S301 in FIG. 28 that any data (data frame) has not been received ("NO" in S301), the processes in step S312 and subsequent steps are performed.

If a resource for returning a block ACK frame has been set ("YES" in S315), the wireless communication module 15 then acquires the resource allocation information (RU information addressed to its own device) (S316), and performs setting in accordance with (the information about) the transmission parameters written therein (S317).

Note that, if a plurality of resources is allocated in this example ("NO" in S318), the process returns to step S316, and the process of acquiring the resource allocation information (S316) and the process of setting the transmission parameters (S317) are repeated.

As a result, the wireless communication module 15 constructs and transmits a block ACK frame in accordance with all the allocated resources (S319). Alternatively, if any resource has not been set ("NO" in S315), the processes in steps S316 to S318 may be skipped, and a block ACK frame may be transmitted in compliance with a conventional system (S319).

For example, in a case where a MU-BAR trigger frame has been received, the resource information regarding the resource allocation for the block ACK frames to be returned later through OFDMA is written therein. Accordingly, block ACK frames addressed to the respective access points AP that have performed coordinated transmission is generated, and the generated block ACK frames are multiplexed by different OFDMAs from one another and are simultaneously returned.

Note that, in this example, parameters (such as transmission power, for example) related to the technology of OFDMA may be set for the coordinator access point AP that performs determination as to retransmission of the coordinately transmitted data among the plurality of access points AP that have performed the coordinated transmission. Meanwhile, a block ACK frame including an acknowledgement is transmitted to an access point AP dependent on the coordinator access point AP.

If it is determined that all the data has been received at this stage ("YES" in S320), the series of reception operations come to an end. If there is data yet to be delivered ("NO" in S320), on the other hand, the process returns to step S301 in FIG. 28, and the data to be retransmitted is awaited.

Note that, if it is determined in the determination process in step S313 that it is not the time to return a block ACK frame ("NO" of S313), a completion notice (Complete notice) is received ("YES" of S321), the data stored in the reception buffer 106 is discarded (S322), and the series of reception operations come to an end. If any completion notice has not been received, on the other hand, the process returns to step S301 in FIG. 28, and data is again awaited.

A flow in an operation of a communication terminal STA is as described above.

As described above, in a communication method (novel system) to which the present technology is applied, a plurality of transmission-side communication devices 10Tx (the plurality of access points AP1 and AP2, for example) cooperates and simultaneously transmits data (an A-MPDU frame, for example) to one reception-side communication device 10Rx (a communication terminal STA, for example). By the method for acknowledging receipt of the data, acknowledgement signals (the block ACK frame in FIG. 21 or 22, for example) from the reception-side communication device 10Rx are simultaneously distributed and transmitted by the technology of simultaneous multiplex access (the technology of OFDMA, for example), so that the acknowledgement signals can be reliably returned to the respective transmission-side communication devices 10Tx.

At that time, a transmission-side communication device 10Tx (the coordinator access point AP1, for example) transmits, to the reception-side communication device 10Rx (a communication terminal STA, for example), a request signal (an ACK request trigger frame such as the MU-BAR trigger frame in FIG. 17, for example) including coordinated transmission information (Coordinate BAR Info in FIG. 19, for example) regarding the coordinated transmission and acknowledgement return information (BAR User Info in FIG. 20, for example) for simultaneously returning an acknowledgement of the coordinately transmitted data to the plurality of transmission-side communication devices 10Tx (the plurality of access points AP1 and AP2, for example).

In return, the reception-side communication device 10Rx (a communication terminal STA, for example) can simultaneously transmit, to the plurality of transmission-side communication devices 10Tx (the plurality of access points AP1 and AP2, for example), acknowledgement signals (the block ACK frame in FIG. 21 or 22, for example) indicating whether the coordinately transmitted data (an A-MPDU frame, for example) has been correctly received, on the basis of the request signal (an ACK request trigger frame such as the MU-BAR trigger frame in FIG. 17, for example) from the transmission-side communication device 10Tx (the coordinator access point AP1, for example), using the technology of simultaneous multiplex access (the technology of OFDMA, for example).

As a result, data receipt acknowledgment can be more reliably performed by the communication method (novel system) to which the present technology is applied.

More specifically, the novel system realizes a communication method for returning block ACK frames simultaneously to a plurality of access points AP, by allocating block ACK frames addressed to the plurality of access points AP as different resource units (RUs). That is, by using an ACK request trigger frame such as a MU-BAR trigger frame, resource blocks for returning an acknowledgement (ACK) of coordinately transmitted data to each access point AP by uplink OFDMA multiplex communication can be allocated.

As a result, the time required for returning a block ACK frame can be shortened. Also, the acknowledgements (ACK) to the respective access points AP can be returned in an overlapping manner. Thus, it is possible to return the acknowledgements (ACK) with higher reliability than a method for returning acknowledgements one by one.

Further, immediately after data is coordinately transmitted, resource information in which resource blocks for performing OFDMA multiplex communication are written is independently transmitted as an ACK request trigger frame, so that synchronization with the frames multiplexed in another OFDMA multiplex communication operation can be reliably achieved. Meanwhile, instead of an ACK request trigger frame, resource information in which the resource blocks for performing OFDMA multiplex communication are written is transmitted at the same time as the data to be coordinately transmitted. Thus, the time required for exchanging the trigger frames can be shortened.

Also, by the novel system, in a case where at least one piece of data in coordinately transmitted data has been correctly received, information indicating successful reception is written, and a block ACK frame can be constructed for an acknowledgement (ACK) of data that has not been successfully received.

That is, in a case where the communication terminal STA has correctly received the data transmitted from at least one access point AP in the coordinately transmitted data, the access point AP (the coordinator access point AP1) that performs retransmission determination can identify, from the acknowledgement (ACK)) addressed to its own device, the retransmission data that needs be retransmitted, on the assumption that the communication terminal STA has correctly received the data transmitted from the other access points AP. Meanwhile, an access point AP that does not perform retransmission determination (an access point AP that operates in a dependent manner) can easily identify the data to be retransmitted, by receiving an acknowledgement (ACK) addressed to its own device.

Further, by the novel system, the sequence of the data to be coordinately transmitted (the MPDUs of an A-MPDU frame, for example) is varied for each access point AP. Thus, even in a case where some interference is simultaneously received at a time of coordinated transmission, it is possible to increase the probability that a communication terminal STA can receive the data (MPDU, for example) transmitted from at least one access point AP. Furthermore, in a case where reception of coordinately transmitted data has been completed by the communication terminal STA, the coordinator access point AP1 can notify the other access points AP of completion of the coordinated transmission, by transmitting a completion notice indicating that the coordinated transmission has been completed.

Also, by the novel system, transmission parameters that are used in the technology of uplink OFDMA multiplex communication can be set (optimized) for the access point AP that performs retransmission determination, and a block ACK frame is then transmitted. Thus, retransmission control can be more reliably performed. Here, the coordinator access point AP1 that performs retransmission determination is set beforehand among a plurality of access points AP, so that the primary receiving end (access point AP) during uplink OFDMA multiplex communication can be identified.

Further, by the novel system, after the same data is coordinately transmitted from a plurality of access points AP, a communication terminal STA that has received the data can send a receipt acknowledgment to the integrated access points AP, using the uplink multiuser MIMO technology. Furthermore, a block ACK frame for a non-integrated access point AP can be returned with transmission parameters set for integrated access points AP.

2. Modifications (Other Example Configurations)

As described above, a transmission-side communication device 10Tx can be formed as an access point AP (a base station), for example, and a reception-side communication device 10Rx can be formed as a communication terminal STA (a terminal station), for example. However, a transmission-side communication device 10(Tx) or a reception-side communication device 10Rx may be formed as a part (a wireless communication module, a wireless chip, or the like, for example) of a device (a component) forming an access point AP or a communication terminal STA.

Further, a reception-side communication device 10Rx formed as a communication terminal STA can be designed as an electronic device having a wireless communication function, such as a smartphone, a tablet-type terminal, a portable telephone, a personal computer, a digital camera, a game machine, a television receiver, a wearable terminal, or a speaker device, for example.

Note that embodiments of the present technology are not limited to the above described embodiments, and various modifications may be made to them without departing from the scope of the present technology.

The present technology may also be embodied in the configurations described below.

(1)

A communication device including
a control unit that performs control to:
transmit data to a reception-side communication device, when coordinated transmission is performed to transmit the data simultaneously from a plurality of transmission-side communication devices to the reception-side communication device;
generate a request signal including coordinated transmission information regarding the coordinated transmission, and acknowledgement return information for returning an acknowledgement of the coordinately transmitted data simultaneously to the plurality of transmission-side communication devices;
transmit the generated request signal to the reception-side communication device; and
receive an acknowledgement signal including the acknowledgement, the acknowledgement signal being transmitted from the reception-side communication device that has received the request signal.

(2)

The communication device according to (1), in which
the coordinated transmission information includes common information that is shared by the plurality of the transmission-side communication devices when the acknowledgement is requested, and
the acknowledgement return information includes unique information that is unique to each of the transmission-side communication devices when the acknowledgement is requested.

(3)

The communication device according to (1) or (2), in which
the acknowledgement return information includes information regarding a resource for returning the acknowledgement signal by a technique of simultaneous multiplex access, information indicating that the acknowledgement signal is compatible with coordinated transmission, information for making a length of the acknowledgement signal uniform, or information for requesting the acknowledgement signal addressed to another transmission-side communication device that has performed the coordinated transmission.

(4)

The communication device according to (3), in which
the technique of simultaneous multiplex access includes a technique of orthogonal frequency division multiple access (OFDMA) or a technique of spatial multiplex stream (Spatial Stream).

(5)

The communication device according to (1) or (2), in which
the coordinated transmission information includes information indicating a start sequence number of the data to be coordinately transmitted, or information for combining and writing acknowledgments of receipt of a plurality of pieces of the coordinately transmitted data.

(6)

The communication device according to any one of (1) to (5), in which
the control unit
identifies retransmission data that needs to be retransmitted in the data included in a coordinately transmitted data frame, on the basis of the acknowledgement obtained from the received acknowledgement signal, and
transmits a trigger frame for performing coordinated transmission of the identified retransmission data, to another transmission-side communication device.

(7)

The communication device according to any one of (1) to (6), in which
the control unit sets a resource individually to each transmission-side communication device in the plurality of transmission-side communication devices, the resource being for returning an acknowledgement frame including an acknowledgement of a coordinately transmitted data frame.

(8)

The communication device according to (7), in which
the control unit recognizes a reception status of data included in the coordinately transmitted data frame, on the basis of the acknowledgement obtained from the received acknowledgement frame.

(9)

The communication device according to any one of (1) to (8), in which
the control unit sets a resource individually for each reception-side communication device in a plurality of the reception-side communication devices, the resource being for returning an acknowledgement frame including an acknowledgement of a coordinately transmitted data frame.

(10)

The communication device according to any one of (1) to (9), in which,
when reception of a coordinately transmitted data frame is completed by the reception-side communication device, the control unit transmits a completion notice indicating that the coordinated transmission is completed, to another transmission-side communication device.

(11)

The communication device according to any one of (1) to (10), in which
the request signal is transmitted as a trigger frame for requesting a return of an acknowledgement frame including an acknowledgement of a coordinately transmitted data frame.

(12)

The communication device according to any one of (1) to (10), in which the request signal is transmitted at the same time as a data frame to be coordinately transmitted.

(13)

The communication device according to (12), in which the request signal is transmitted continuously with the data frame, or is transmitted while included in the data frame.

(14)

The communication device according to any one of (1) to (13), in which the data is coordinately transmitted as a data frame in which a plurality of subframes is aggregated, and a sequence of the subframes varies with each of the data frames to be coordinately transmitted from the plurality of transmission-side communication devices.

(15)

A communication method implemented by a communication device, the communication method including performing control to:

transmit data to a reception-side communication device, when coordinated transmission is performed to transmit the data simultaneously from a plurality of transmission-side communication devices to the reception-side communication device;

generate a request signal including coordinated transmission information regarding the coordinated transmission, and acknowledgement return information for returning an acknowledgement of the coordinately transmitted data simultaneously to the plurality of transmission-side communication devices;

transmit the generated request signal to the reception-side communication device; and receive an acknowledgement signal including the acknowledgement, the acknowledgement signal being transmitted from the reception-side communication device that has received the request signal.

(16)

A communication device including a control unit that performs control to:

receive data transmitted from a plurality of transmission-side communication devices, when coordinated transmission is performed to transmit the data simultaneously from the plurality of transmission-side communication devices to a reception-side communication device;

generate an acknowledgement corresponding to correctly received data of the coordinately transmitted data;

receive a request signal transmitted from the transmission-side communication device, the request signal including coordinated transmission information regarding the coordinated transmission and acknowledgement return information for simultaneously returning an acknowledgement of the coordinately transmitted data to the plurality of transmission-side communication devices; and transmit an acknowledgement signal including the generated acknowledgement, on the basis of the received request signal.

(17)

The communication device according to (16), in which, when the data transmitted from at least one transmission-side communication device in the coordinately transmitted data has been correctly received, the control unit generates the acknowledgement, on the assumption that the data transmitted from another transmission-side communication device has also been correctly received.

(18)

The communication device according to (16) or (17), in which the acknowledgement return information includes at least information regarding a resource for returning the acknowledgement signal by using a technique of simultaneous multiplex access, and the control unit sets a parameter related to the technique of simultaneous multiplex access, for the transmission-side communication device that performs determination as to retransmission of the coordinately transmitted data, the transmission-side communication device being a transmission-side communication device in the plurality of transmission-side communication devices.

(19)

The communication device according to any one of (16) to (18), in which the control unit transmits an acknowledgement frame including the acknowledgement to the transmission-side communication device that does not perform determination as to retransmission of the coordinately transmitted data.

(20)

A communication method implemented by a communication device, the communication method including performing control to:

receive data transmitted from a plurality of transmission-side communication devices, when coordinated transmission is performed to transmit the data simultaneously from the plurality of transmission-side communication devices to a reception-side communication device;

generate an acknowledgement corresponding to correctly received data of the coordinately transmitted data;

receive a request signal transmitted from the transmission-side communication device, the request signal including coordinated transmission information regarding the coordinated transmission and acknowledgement return information for simultaneously returning an acknowledgement of the coordinately transmitted data to the plurality of transmission-side communication devices; and transmit an acknowledgement signal including the generated acknowledgement, on the basis of the received request signal.

REFERENCE SIGNS LIST

10 Communication device
11 Internet connection module
12 Information input module
13 Device control unit
14 Information output module
15 Wireless communication module
101 Interface
102 Transmission buffer
103 Network management unit
104 Transmission frame construction unit
105 Reception data construction unit
106 Reception buffer
107 Sequence management unit
108 Spatial multiplex transmission processing unit
109 Spatial multiplex reception processing unit
110 Management information generation unit
111 Management information processing unit
112 Wireless transmission processing unit
113 Transmission power control unit
114 Transmission/reception antenna control unit
115 Detection threshold control unit
116 Wireless reception processing unit 151 Transmission/reception data input/output unit
152 Control unit
153 Radio signal transmission/reception unit

The invention claimed is:
1. A communication device, comprising:
circuitry configured to:
perform coordinated transmission of data simultaneously from a plurality of transmission-side communication devices to a reception-side communication device, wherein the plurality of transmission-side communication devices includes the communication device;
generate a request signal that includes coordinated transmission information and acknowledgement return information, wherein
the coordinated transmission information is regarding the coordinated transmission,
the coordinated transmission information includes common information shared by each of the plurality of transmission-side communication devices,
the common information includes a bit to identify specific information to perform the coordinated transmission,
the acknowledgement return information is information to simultaneously return an acknowledgement to the plurality of transmission-side communication devices,
the acknowledgement return information includes unique information that is unique to each of the plurality of transmission-side communication devices, and
the acknowledgement is associated with the coordinately transmitted data;
transmit the generated request signal to the reception-side communication device; and
receive, based on the transmitted request signal, an acknowledgement signal including the acknowledgement, wherein
the acknowledgement signal is transmitted simultaneously to each of the plurality of transmission-side communication devices from the reception-side communication device that has received the request signal.

2. The communication device according to claim 1, wherein the acknowledgement return information further includes at least one of:
information regarding a resource to return the acknowledgement signal by a technique of simultaneous multiplex access,
information which indicates that the acknowledgement signal is compatible with the coordinated transmission,
information to make a length of the acknowledgement signal uniform, or
information to request the acknowledgement signal addressed to a specific transmission-side communication device of the plurality of the transmission-side communication devices.

3. The communication device according to claim 2, wherein
the technique of simultaneous multiplex access includes one of a technique of orthogonal frequency division multiple access (OFDMA) or a technique of spatial multiplex stream.

4. The communication device according to claim 1, wherein
the coordinated transmission information further includes one of information indicating a start sequence number of data in the coordinately transmitted data, or information to combine and write acknowledgments of receipt of a plurality of pieces of the coordinately transmitted data.

5. The communication device according to claim 1, wherein
the circuitry is further configured to:
identify retransmission data in the coordinately transmitted data based on the received acknowledgement signal; and
transmit a trigger frame to perform coordinated transmission of the identified retransmission data, wherein the trigger frame is transmitted to a specific transmission-side communication device of the plurality of transmission-side communication devices.

6. The communication device according to claim 1, wherein
the circuitry is further configured to set a resource individually to each transmission-side communication device of the plurality of transmission-side communication devices, and
the resource is to return the acknowledgement of the coordinately transmitted data.

7. The communication device according to claim 6, wherein
the circuitry is further configured to recognize, based on the received acknowledgement signal, a reception status of data included in the coordinately transmitted data.

8. The communication device according to claim 1, wherein
the circuitry is further configured to set a resource individually for each reception-side communication device of a plurality of reception-side communication devices,
the plurality of reception-side communication devices includes the reception-side communication device, and
the resource is to return the acknowledgement of the coordinately transmitted data.

9. The communication device according to claim 1, wherein
the circuitry is further configured to transmit a completion notice to a specific transmission-side communication device of the plurality of transmission-side communication devices,
the transmission of the completion notice is based on completion of reception of the coordinately transmitted data by the reception-side communication device, and
the completion notice indicates completion of the coordinated transmission.

10. The communication device according to claim 1, wherein
the generated request signal is transmitted as a trigger frame to request the return of the acknowledgement of the coordinately transmitted data.

11. The communication device according to claim 1, wherein
the generated request signal is transmitted at the same time as data in the coordinately transmitted data.

12. The communication device according to claim 11, wherein
the generated request signal is one of transmitted continuously with the coordinately transmitted data or is transmitted while included in the coordinately transmitted data.

13. The communication device according to claim 1, wherein
- the data of the communication device is transmitted as a data frame,
- the data frame includes a plurality of aggregated subframes, and
- a sequence of the plurality of aggregated subframes varies for each of the plurality of transmission-side communication devices.

14. A communication method implemented by a communication device, the communication method comprising:
- performing coordinated transmission of data simultaneously from a plurality of transmission-side communication devices to a reception-side communication device, wherein the plurality of transmission-side communication devices includes the communication device;
- generating a request signal that includes coordinated transmission information and acknowledgement return information, wherein
    - the coordinated transmission information is regarding the coordinated transmission,
    - the coordinated transmission information includes common information shared by each of the plurality of transmission-side communication devices,
    - the common information includes a bit to identify specific information to perform the coordinated transmission,
    - the acknowledgement return information is information to simultaneously return an acknowledgement to the plurality of transmission-side communication devices,
    - the acknowledgement return information includes unique information that is unique to each of the plurality of transmission-side communication devices, and
    - the acknowledgement is associated with the coordinately transmitted data;
- transmitting the generated request signal to the reception-side communication device; and
- receiving, based on the transmitted request signal, an acknowledgement signal including the acknowledgement, wherein
    - the acknowledgement signal is transmitted simultaneously to each of the plurality of transmission-side communication devices from the reception-side communication device that has received the request signal.

15. A communication device, comprising:
circuitry configured to:
- receive data coordinately transmitted from a plurality of transmission-side communication devices, wherein
    - the coordinately transmitted data is based on coordinated transmission, and
    - the coordinated transmission is performed by the plurality of transmission-side communication devices;
- generate an acknowledgement corresponding to correct reception of the coordinately transmitted data;
- receive a request signal transmitted from a transmission-side communication device of the plurality of transmission-side communication devices, wherein
    - the request signal includes coordinated transmission information and acknowledgement return information,
    - the coordinated transmission information is information regarding the coordinated transmission,
    - the coordinated transmission information includes common information shared by each of the plurality of transmission-side communication devices,
    - the common information includes a bit to identify specific information to perform the coordinated transmission,
    - the acknowledgement return information is information to simultaneously return the acknowledgement to the plurality of transmission-side communication devices,
    - the acknowledgement return information includes unique information that is unique to each of the plurality of transmission-side communication devices, and
    - the acknowledgement is associated with the correct reception of the coordinately transmitted data; and
- transmit an acknowledgement signal simultaneously to each of the plurality of transmission-side communication devices, wherein
    - the transmission of the acknowledgement signal is based on the received request signal, and
    - the acknowledgement signal includes the generated acknowledgement.

16. The communication device according to claim 15, wherein
the circuitry is further configured to generate the acknowledgement based on:
- correct reception of first data, among the coordinately transmitted data, from a first transmission-side communication device of the plurality of transmission-side communication devices, and
- an assumption about correct reception of second data, among the coordinately transmitted data, from a second transmission-side communication device of the plurality of transmission-side communication devices.

17. The communication device according to claim 15, wherein
- the acknowledgement return information further includes at least information regarding a resource to return the acknowledgement signal based on a technique of simultaneous multiplex access,
- the circuitry is further configured to set a parameter related to the technique of simultaneous multiplex access, for a first transmission-side communication device of the plurality of transmission-side communication devices, and
- the first transmission-side communication device performs determination related to retransmission of the coordinately transmitted data.

18. The communication device according to claim 17, wherein
- the circuitry is further configured to transmit the acknowledgement to a second transmission-side communication device of the plurality of transmission-side communication devices, and
- the second transmission-side communication device does not perform the determination related to the retransmission of the coordinately transmitted data.

19. A communication method implemented by a communication device, the communication method comprising:
- receiving data simultaneously transmitted from a plurality of transmission-side communication devices, wherein
    - the coordinately transmitted data is based on coordinated transmission, and the coordinated transmission is performed by the plurality of transmission-side communication devices;
generating an acknowledgement corresponding to correct reception of the coordinately transmitted data;
receiving a request signal transmitted from a transmission-side communication device of the plurality of transmission-side communication devices, wherein
the request signal includes coordinated transmission information and acknowledgement return information,
the coordinated transmission information is information regarding the coordinated transmission,
the coordinated transmission information includes common information shared by each of the plurality of transmission-side communication devices,
the common information includes a bit to identify specific information to perform the coordinated transmission,
the acknowledgement return information is information to simultaneously return the acknowledgement to the plurality of transmission-side communication devices,
the acknowledgement return information includes unique information that is unique to each of the plurality of transmission-side communication devices, and
the acknowledgement is associated with the correct reception of the coordinately transmitted data; and
transmitting an acknowledgement signal simultaneously to each of the plurality of transmission-side communication devices, wherein
the transmission of the acknowledgement signal is based on the received request signal, and
the acknowledgement signal includes the generated acknowledgement.

* * * * *